United States Patent
Eto

(10) Patent No.: US 10,771,755 B2
(45) Date of Patent: Sep. 8, 2020

(54) IMAGE PROCESSING APPARATUS, IMAGE PROCESSING METHOD, AND PROGRAM

(71) Applicant: SONY CORPORATION, Tokyo (JP)

(72) Inventor: Hiroaki Eto, Kanagawa (JP)

(73) Assignee: Sony Corporation, Tokyo (JP)

( * ) Notice: Subject to any disclaimer, the term of this patent is extended or adjusted under 35 U.S.C. 154(b) by 73 days.

(21) Appl. No.: 16/301,096

(22) PCT Filed: May 1, 2017

(86) PCT No.: PCT/JP2017/017114
§ 371 (c)(1),
(2) Date: Nov. 13, 2018

(87) PCT Pub. No.: WO2017/203941
PCT Pub. Date: Nov. 30, 2017

(65) Prior Publication Data
US 2019/0191138 A1    Jun. 20, 2019

(30) Foreign Application Priority Data
May 25, 2016 (JP) ................. 2016-104439

(51) Int. Cl.
*G06K 9/00* (2006.01)
*H04N 9/77* (2006.01)
(Continued)

(52) U.S. Cl.
CPC ............ *H04N 9/77* (2013.01); *H04N 1/646* (2013.01); *H04N 9/646* (2013.01); *H04N 9/67* (2013.01); *H04N 11/20* (2013.01)

(58) Field of Classification Search
CPC combination set(s) only.
See application file for complete search history.

(56) References Cited

U.S. PATENT DOCUMENTS

2007/0053607 A1* 3/2007 Mitsunaga ............... H04N 9/69
382/274
2008/0246883 A1* 10/2008 Murashita ................. G06T 5/40
348/649
(Continued)

FOREIGN PATENT DOCUMENTS

JP    2005-039679 A    2/2005
JP    2008-182627 A    8/2008
(Continued)

OTHER PUBLICATIONS

International Search Report and Written Opinion of PCT Application No. PCT/JP2017/017114, dated Jul. 25, 2017, 1 page of English Translation and 5 pages of ISRWO.

*Primary Examiner* — Alex Kok S Liew
(74) *Attorney, Agent, or Firm* — Chip Law Group

(57) ABSTRACT

An apparatus and a method that decrease a banding phenomenon in a subsampled image and achieve high image quality are provided. A subsampled image obtained by copying an adjacent pixel value to a pixel value thinning position is accepted as an input image; a correction target signal global gain is calculated as a ratio between a slope of a correction target signal and a slope of a luminance signal of a global region made up of a plurality of consecutive pixels including a pixel position of the correction target pixel of the input image; a luminance local slope is calculated as a slope of the luminance signal of a local region which is a region within the global region, including the pixel position of the correction target pixel of the input image and smaller than the global region; and a corrected pixel value of the correction target pixel is calculated.

13 Claims, 16 Drawing Sheets

(51) Int. Cl.
*H04N 11/20* (2006.01)
*H04N 1/64* (2006.01)
*H04N 9/64* (2006.01)
*H04N 9/67* (2006.01)

(56) References Cited

U.S. PATENT DOCUMENTS

2009/0284545 A1\* 11/2009 Watanabe ............ G09G 3/3611
345/589
2011/0317074 A1\* 12/2011 Kim ........................ G09G 5/04
348/673

FOREIGN PATENT DOCUMENTS

JP 2014-033357 A 2/2014
JP 2014-045398 A 3/2014

\* cited by examiner

FIG. 1
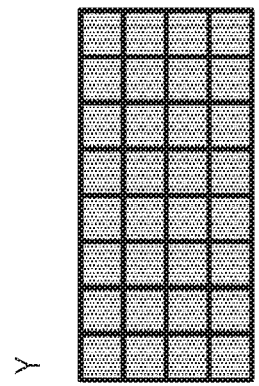
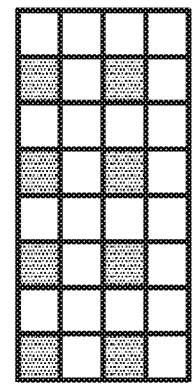
FIG. 1C 4:2:0 SAMPLING
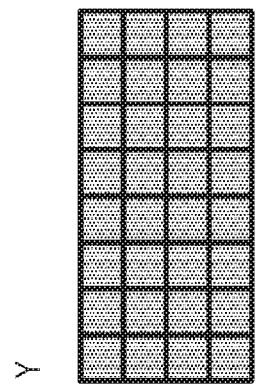
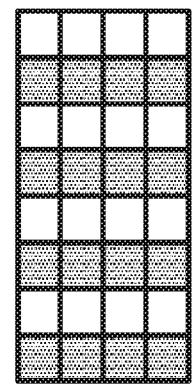
FIG. 1B 4:2:2 SAMPLING
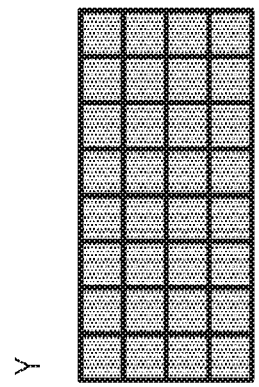
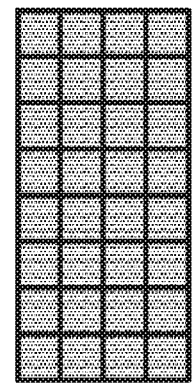
FIG. 1A 4:4:4 SAMPLING
▓ : PIXEL POSITIONS TO BE SAMPLED
☐ : PIXEL POSITIONS NOT TO BE SAMPLED FIG. 2
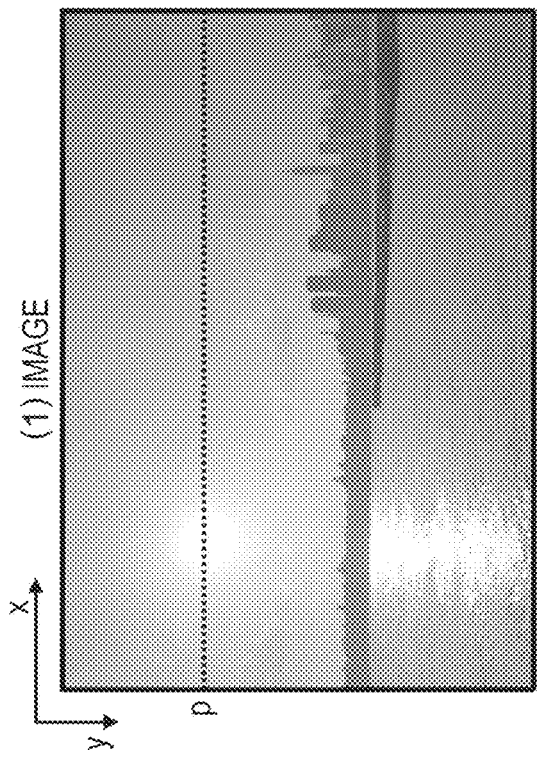
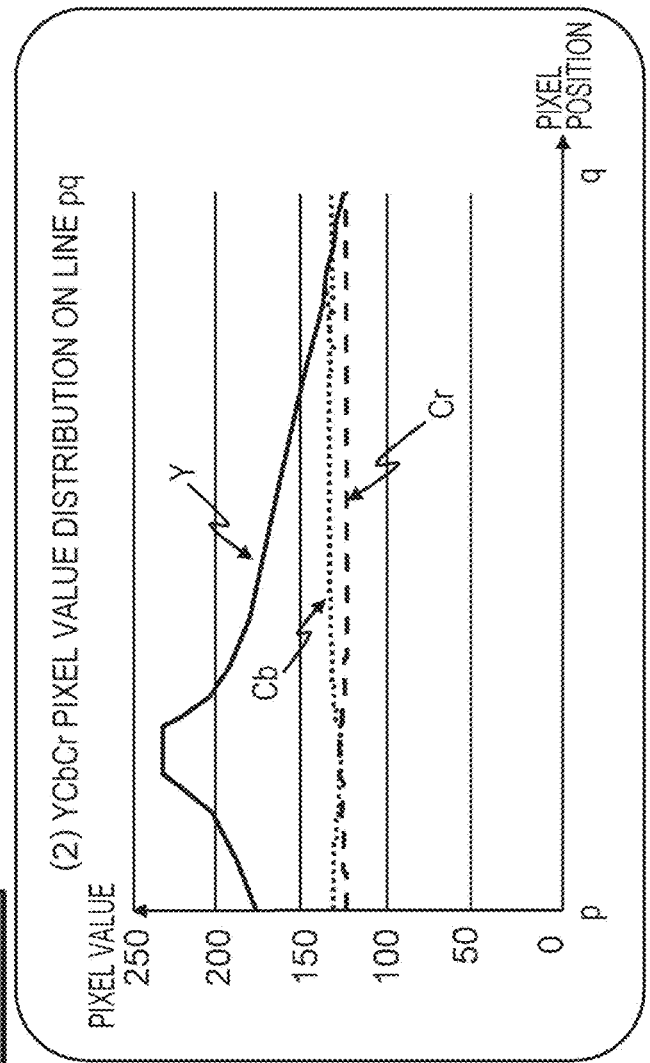

FIG. 3
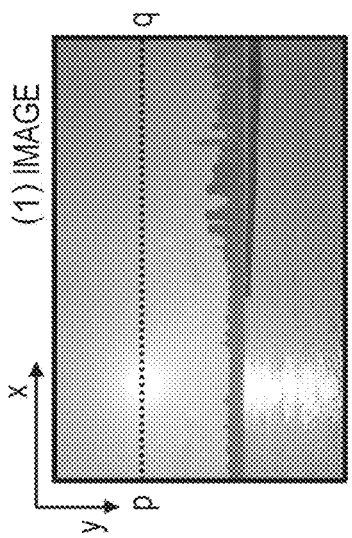
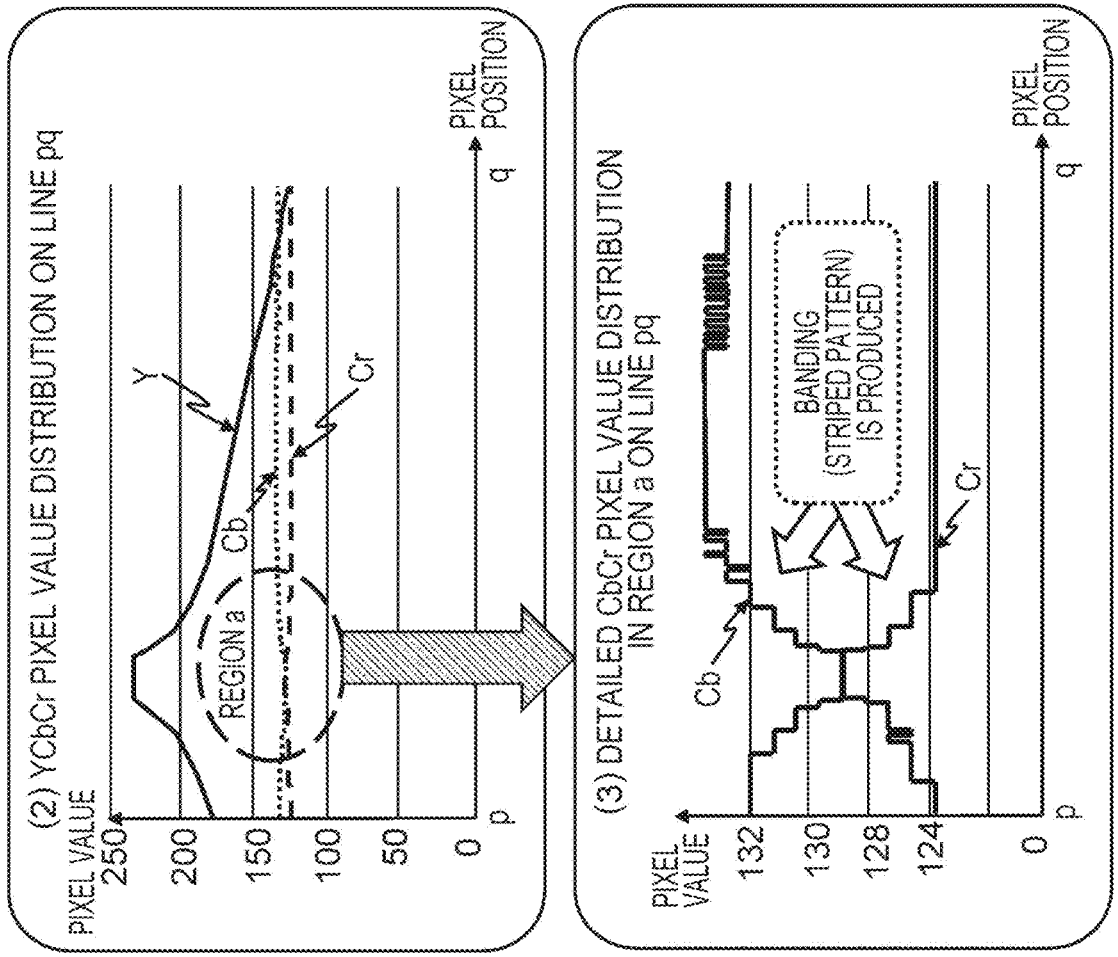

FIG. 10

(PROCESS OF SIGNAL CORRECTION UNIT: S23)
CALCULATE PIXEL VALUE CHANGE RATIO (LOCAL SLOPE) [ΔY(L)] OF LUMINANCE Y PIXEL AT POSITION OF CORRECTION TARGET PIXEL (x, y) WITH RESPECT TO ADJACENT PIXEL ON HORIZONTAL LINE AND FURTHER CALCULATE CORRECTED PIXEL VALUE [Rout, Gout, Bout] FOR EACH PIXEL OF RGB CORRECTION TARGET PIXELS BY MULTIPLYING LOCAL SLOPE [ΔY(L)] OF LUMINANCE Y BY EACH OF RGB GLOBAL GAINS [GainR(G), GainG(G), GainB(G)].

EXAMPLE OF CALCULATION PROCESS FOR CORRECTED PIXEL VALUE Bout(x, y) OF B PIXEL VALUE AT PIXEL POSITION (x, y)

102 SIGNAL CORRECTION UNIT

S23a CALCULATE LOCAL SLOPE [ΔY(L)] OF LUMINANCE Y

S23b ΔY(L) × GainB(G)

S23c CORRECTED PIXEL VALUE
Bout(x, y)
= B(x−1, y)
+ (ΔY(L) × GainB(G))

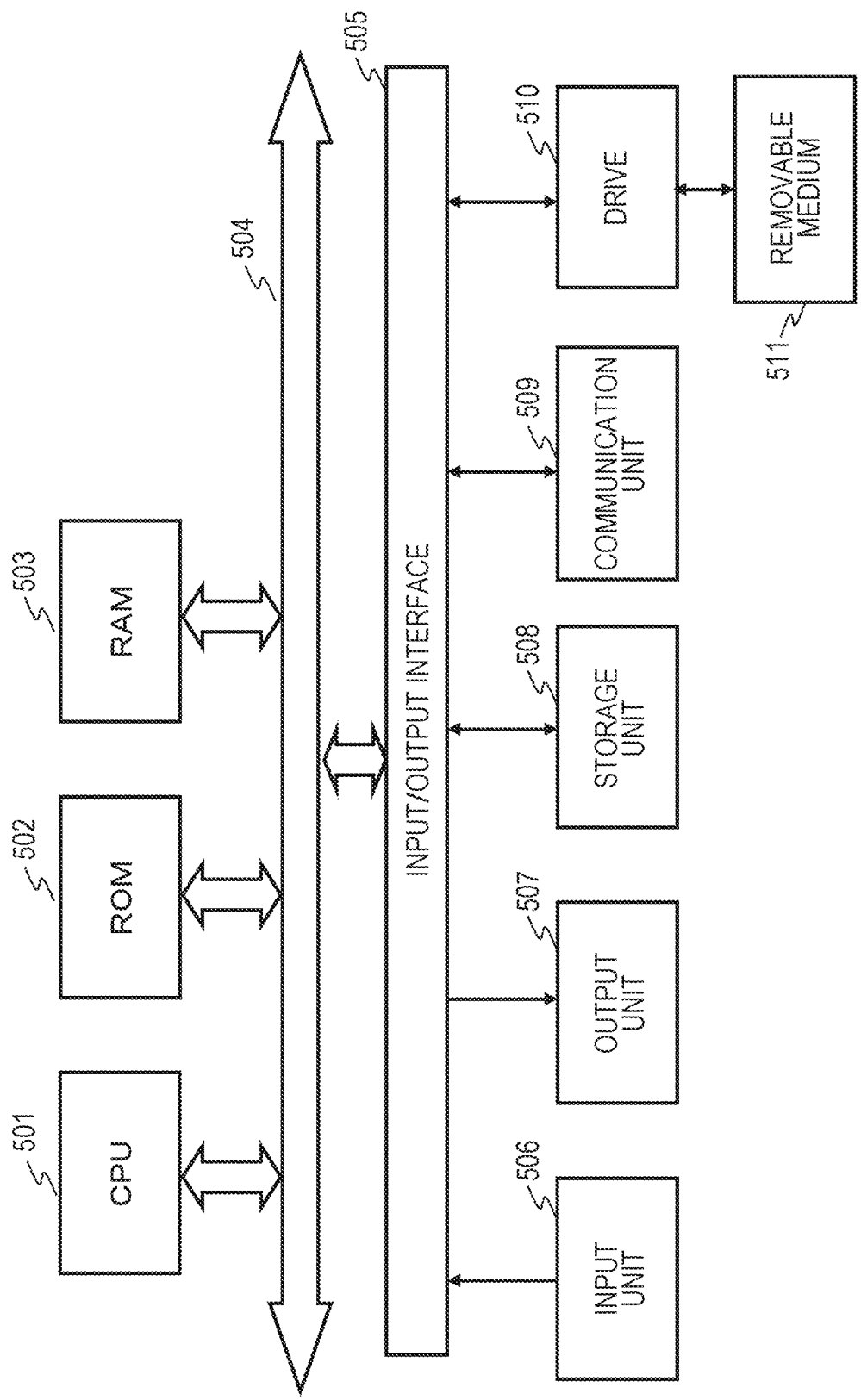

IMAGE PROCESSING APPARATUS, IMAGE PROCESSING METHOD, AND PROGRAM

CROSS REFERENCE TO RELATED APPLICATIONS

This application is a U.S. National Phase of International Patent Application No. PCT/JP2016/017114 filed on May 1, 2017, which claims priority benefit of Japanese Patent Application No. JP 2016-104439 filed in the Japan Patent Office on May 25, 2016. Each of the above-referenced applications is hereby incorporated herein by reference in its entirety.

TECHNICAL FIELD

The present disclosure relates to an image processing apparatus, an image processing method, and a program. In more detail, the present disclosure relates to an image processing apparatus, an image processing method, and a program which decrease deterioration in image quality of an interpolation image generated on the basis of a so-called subsampled image signal in which one pixel signal is set in units of a plurality of pixels.

BACKGROUND ART

In a transferring or recording process for image data, data is generated by thinning out a part of signals in units of one pixel in order to reduce the amount of data.

For example, in the case of using YCbCr signals made up of a luminance signal Y and chrominance signals Cb and Cr, the amount of data is reduced by data thinning, for example, by adapting the chrominance signals Cb and Cr to single signals in units of several pixels.

A YCbCr image is image data corresponding to a color space expressed using the luminance signal Y and the two chrominance signals (Cb and Cr).

Cb represents a signal obtained by multiplying (B−Y) obtained by subtracting luminance Y from a B signal by a constant and Cr represents a signal obtained by multiplying (R−Y) obtained by subtracting luminance Y from an R signal by a constant.

Note that, although YCbCr is sometimes written as YPbPr, both YCbCR and YPbPr mean substantially the same color signal. In addition, YCbCr is also expressed as YUV in some cases.

In the following explanation, the description will be given of processes for the YCbCr signals. However, the processes of the present application are processes also applicable to each of the YUV and YPbPr signals.

At the time of transmission and recording of the YCbCr signals, a signal amount reduction process is performed in some cases. Specifically, a method of thinning out chrominance (Cb and Cr) components is used in many cases. As human eyes are more sensitive to changes in brightness than changes in color, a process of reducing the amount of data by thinning out the information amount of the chrominance components CbCr without reducing a luminance component Y is widely performed.

Widely used sampling formats include the following types.

(1) 4:4:4 sampling

This sampling format is of a format that holds respective YCbCr signals of each pixel wholly without thinning out.

(2) 4:2:2 sampling

Among the YCbCr signals of each pixel, a Y signal as the luminance signal is held for all the pixels, but CbCr signals as chrominance signals are held for every other pixel in a horizontal direction.

This is a technique adopted for general business video. At the time of reproduction such as printing or display, the chrominance signals CbCr for one vertical line is used as the chrominance signals CbCr for two vertical lines.

(3) 4:2:0 sampling

Among the YCbCr signals of each pixel, the Y signal as the luminance signal is held for all the pixels, but only single CbCr signals as the chrominance signals are held for every four pixels.

Specifically, only the Cb signal is acquired at an odd-numbered scanning line and the Cr signal is acquired at an even-numbered scanning line in a first frame; conversely, only the Cr signal is acquired at an odd-numbered scanning line and only the Cb signal is acquired at an even-numbered scanning line in a second frame. In this manner, the CbCr signals are acquired by thinning out on a scanning line basis. At the time of reproduction, for example, a chrominance signal at a pixel position where there is no chrominance signal is interpolated using a chrominance signal at an adjacent pixel position on the scanning line.

This is the main streaming technique for home digital video and is used in a format such as moving picture experts group (MPEG) compression format and advanced video coding high definition (AVCHD) used in a digital versatile disc (DVD) and the like.

In this manner, in the transmission and recording of YCbCr, image data to which a process of thinning out the chrominance signals CbCr from the YCbCr signals is applied, that is, subsampled image data, is transmitted or recorded in order to reduce the signal amount in many cases.

As described above, the reason why the chrominance signals CbCr are subsampled instead of the luminance signal Y is that the vision is insensitive to changes in chrominance as compared with luminance.

In such a subsampled image, since the original CbCr signals are not set at about half or more than half of pixels among constituent pixels of the image, it is necessary to perform an interpolation process to set the CbCr signals at pixel positions missing the chrominance signals CbCr signals, in a case where a display process for a display or printing is performed. This interpolation process is performed, for example, as a process of copying CbCr pixel values at neighboring pixel positions to pixel positions missing the CbCr signals. However, when such a simple copy is performed, a folding component of the chrominance signal is produced in a color edge region which is a color boundary where the color changes, and this leads to a difficulty that a striped pattern in which the color is changed stepwise, that is, so-called banding, is observed.

For example, Patent Document 1 (Japanese Patent Application Laid-Open No. 2014-45398) is cited as a prior art that discloses a configuration for decreasing this banding phenomenon.

This Patent Document 1 discloses a configuration that calculates a similarity between a neighboring pixel region of a correction target pixel and a pixel region of an adjacent vertical line pixel or horizontal line pixel and calculates a corrected pixel value by pixel value combination in which a pixel value contribution ratio is adjusted according to the similarity.

However, if such similarity determination or a correction process is performed for all the pixels, difficulties of growing processing cost and a possibility of bringing about delay of image display are raised.

CITATION LIST

Patent Document

Patent Document 1: Japanese Patent Application Laid-Open No. 2014-45398

SUMMARY OF THE INVENTION

Problems to be Solved by the Invention

For example, the present disclosure has been made in view of such a situation and an object thereof is to provide an image processing apparatus, an image processing method, and a program which generate an output image with less degradation in image quality in a configuration that generates an output image in which information necessary for each pixel is set by an interpolation process or the like on a so-called subsampled image signal in which a part of pixel information is thinned out.

Solutions to Problems

A first aspect of the present disclosure is an image processing apparatus including a signal correction unit that:
accepts a subsampled image obtained by copying an adjacent pixel value to a pixel value thinning position, as an input image;
calculates a correction target signal global gain which is a ratio between a slope of a correction target signal and a slope of a luminance signal of a global region made up of a plurality of consecutive pixels including a pixel position of the correction target pixel of the input image;
calculates a luminance local slope which is a slope of the luminance signal of a local region smaller than the global region, the local region being a region within the global region, including the pixel position of the correction target pixel of the input image; and
calculates a corrected pixel value of the correction target pixel by multiplying the luminance local slope by the correction target signal global gain and applying a multiplication result.

Furthermore, a second aspect of the present disclosure is an image processing method executed in an image processing apparatus, the image processing method including:
accepting, by a signal processing unit, an input of a subsampled image obtained by copying an adjacent pixel value to a pixel value thinning position, as an input image;
calculating, by the signal processing unit, a correction target signal global gain which is a ratio between a slope of a correction target signal and a slope of a luminance signal of a global region made up of a plurality of consecutive pixels including a pixel position of a correction target pixel of the input image;
calculating, by the signal processing unit, a luminance local slope which is a slope of the luminance signal of a local region smaller than the global region, the local region being a region within the global region, including the pixel position of the correction target pixel of the input image; and
calculating, by the signal processing unit, a corrected pixel value of the correction target pixel by multiplying the luminance local slope by the correction target signal global gain and applying a multiplication result.

Furthermore, a third aspect of the present disclosure is a program that executes an image process in an image processing apparatus, the program causing a signal processing unit to:
accept an input of a subsampled image obtained by copying an adjacent pixel value to a pixel value thinning position, as an input image;
execute a calculation process for a correction target signal global gain which is a ratio between a slope of a correction target signal and a slope of a luminance signal of a global region made up of a plurality of consecutive pixels including a pixel position of a correction target pixel of the input image;
execute a calculation process for a luminance local slope which is a slope of the luminance signal of a local region smaller than the global region, the local region being a region within the global region, including the pixel position of the correction target pixel of the input image; and
execute a process of calculating a corrected pixel value of the correction target pixel by multiplying the luminance local slope by the correction target signal global gain and applying a multiplication result.

Note that the programs of the present disclosure are programs that can be provided by a storage medium or a communication medium configured to provide a program in a computer readable format, for example, to an information processing apparatus or a computer system capable of executing a variety of program codes. By providing such programs in a computer readable format, processes according to the programs are implemented on the information processing apparatus or the computer system.

Still another object, feature, and advantage of the present disclosure will be made clear through more detailed description based on the embodiments of the present disclosure mentioned below and the accompanying drawings. Note that, in the present description, the term "system" refers to a logical group configuration of a plurality of apparatuses and is not limited to a system in which apparatuses having respective configurations are accommodated in the same housing.

Effects of the Invention

According to the configuration of an embodiment of the present disclosure, an apparatus and a method that decrease a banding phenomenon in a subsampled image and achieve high image quality are implemented.

Specifically, a subsampled image obtained by copying an adjacent pixel value to a pixel value thinning position is accepted as an input image; a correction target signal global gain is calculated as a ratio between a slope of a correction target signal and a slope of a luminance signal of a global region made up of a plurality of consecutive pixels including a pixel position of the correction target pixel of the input image; a luminance local slope is calculated as a slope of the luminance signal of a local region smaller than the global region, which is a region within the global region, including the pixel position of the correction target pixel of the input image; and a corrected pixel value of the correction target pixel is calculated by multiplying the luminance local slope by the correction target signal global gain and applying a multiplication result. For example, the corrected pixel value is calculated by adding a correction target signal pixel value at an end of the local region to a multiplication value.

Through these processes, an apparatus and a method that decrease a banding phenomenon in the subsampled image and achieve high image quality are implemented.

Note that the effects described in the present description merely serve as examples and not construed to be limited. There may be an additional effect as well.

BRIEF DESCRIPTION OF DRAWINGS

FIGS. 1A, 1B, and 1C diagrams for explaining subsampled images.

FIG. 2 is a diagram for explaining characteristics of a subsampled image.

FIG. 3 is a diagram for explaining bunting produced in a subsampled image.

FIG. 10 is a diagram for explaining a process executed by the signal correction unit of the image processing apparatus of the present disclosure.

FIG. 16 is a diagram for explaining a hardware configuration example of the image processing apparatus of the present disclosure.

MODE FOR CARRYING OUT THE INVENTION

Figure 4:
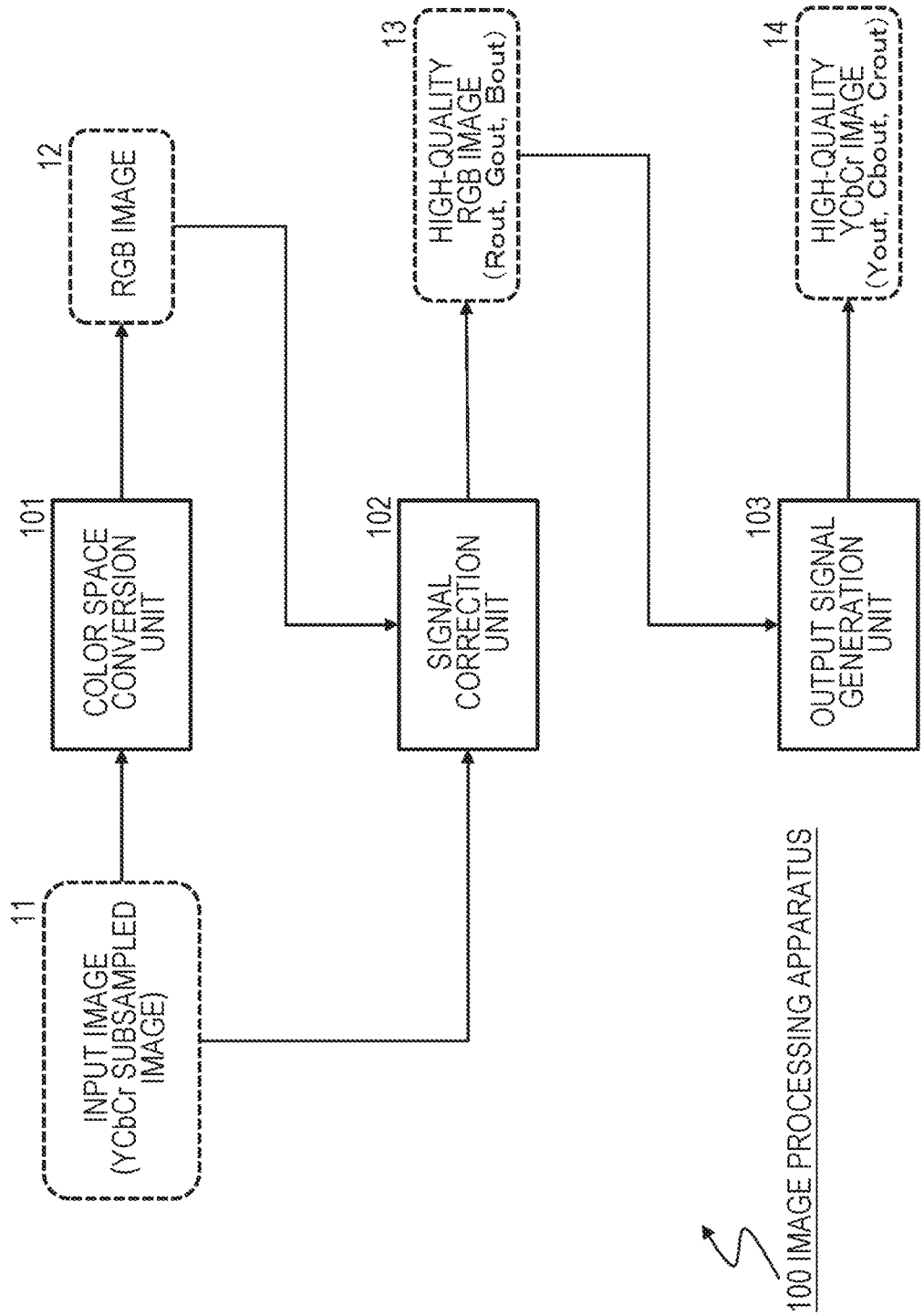
FIG. 4 is a diagram for explaining a configuration and a process of an image processing apparatus of the present disclosure.

Hereinafter, details of an image processing apparatus, an image processing method, and a program of the present disclosure will be described with reference to the drawings. Note that the explanation will be made in accordance with the following items.

1. About Outline of Subsampled Image
2. About Configuration and Process of Image Processing Apparatus of Present Disclosure 2-1. About Process executed by Color Space Conversion Unit
2-2. About Process Executed by Signal Correction Unit
2-3. About Process Executed by Output Signal Generation Unit 3. About Image Processing Sequence Executed by Image Processing Apparatus
4. About Hardware Configuration Example of Image Processing Apparatus
5. Summary of Configuration of Present Disclosure

[1. About Outline of Subsampled Image]

First, the outline of a subsampled image will be described.

As described earlier, in a transferring or recording process for image data, data is generated by thinning out a part of signals in units of one pixel in order to reduce the amount of data.

For example, in the case of using YCbCr signals made up of a luminance signal Y and chrominance signals Cb and Cr, the amount of data is reduced by data thinning, for example, by adapting the chrominance signals Cb and Cr to single signals in units of several pixels.

A YCbCr image is image data corresponding to a color space expressed using the luminance signal Y and the two chrominance signals (Cb and Cr).

Cb represents a signal obtained by multiplying (B−Y) obtained by subtracting luminance Y from a B signal by a constant and Cr represents a signal obtained by multiplying (R−Y) obtained by subtracting luminance Y from an R signal by a constant.

Note that, although YCbCr is sometimes written as YPbPr, both YCbCR and YPbPr mean substantially the same color signal. In addition, YCbCr is also expressed as YUV in some cases.

In the following explanation, the description will be given of processes for the YCbCr signals. However, the processes of the present application are processes also applicable to each of the YUV and YPbPr signals.

At the time of transmission and recording of the YCbCr signals, a signal amount reduction process is performed in some cases. Specifically, a method of thinning out chrominance (Cb and Cr) components is used in many cases. As human eyes are more sensitive to changes in brightness than changes in color, a process of reducing the amount of data by thinning out the information amount of the chrominance components CbCr without reducing a luminance component Y is widely performed.

A sampling format of a component video signal adopted as a specific video format will be described with reference to FIGS. 1A, 1B, and 1C.

Widely used sampling formats include the following types as illustrated in FIGS. 1A, 1B, and 1C.

(1) 4:4:4 sampling

This sampling format is of a format that holds respective YCbCr signals of each pixel wholly without thinning out.

(2) 4:2:2 sampling

Among the YCbCr signals of each pixel, a Y signal as the luminance signal is held for all the pixels, but CbCr signals as chrominance signals are held for every other pixel in a horizontal direction.

This is a technique adopted for general business video. At the time of reproduction such as printing or display, the chrominance signals CbCr for one vertical line is used as the chrominance signals CbCr for two vertical lines.

(3) 4:2:0 sampling

Among the YCbCr signals of each pixel, the Y signal as the luminance signal is held for all the pixels, but only single CbCr signals as the chrominance signals are held for every four pixels.

Specifically, only the Cb signal is acquired at an odd-numbered scanning line and the Cr signal is acquired at an even-numbered scanning line in a first frame; conversely, only the Cr signal is acquired at an odd-numbered scanning line and only the Cb signal is acquired at an even-numbered scanning line in a second frame. In this manner, the CbCr signals are acquired by thinning out on a scanning line basis. At the time of reproduction, for example, a chrominance signal at a pixel position where there is no chrominance signal is interpolated using a chrominance signal at an adjacent pixel position on the scanning line.

This is the main streaming technique for home digital video and is used in a format such as MPEG compression format and AVCHD used in the DVD and the like.

In this manner, in the transmission and recording of YCbCr, image data to which a process of thinning out the chrominance signals CbCr from the YCbCr signals is applied, that is, subsampled image data, is transmitted or recorded in order to reduce the signal amount in many cases.

As described above, the reason why the chrominance signals CbCr are subsampled instead of the luminance signal Y is that the vision is insensitive to changes in chrominance as compared with luminance.

In such a subsampled image, since the original CbCr signals are not set at about half or more than half of pixels among constituent pixels of the image, it is necessary to perform an interpolation process to set the CbCr signals at pixel positions missing the chrominance signals CbCr signals, in a case where a display process for a display or printing is performed. This interpolation process is performed, for example, as a process of copying CbCr pixel values at neighboring pixel positions to pixel positions missing the CbCr signals. However, when such a simple copy is performed, a folding component of the chrominance signal is produced in a color edge region which is a color boundary where the color changes, and this leads to a difficulty that a striped pattern in which the color is changed stepwise, that is, so-called banding, is observed.

A specific example of the banding phenomenon will be described with reference to FIGS. 2 and 3.

A (1) image illustrated in FIG. 2 is an example of display image data generated from coded data in accordance with the above-described 4:2:0 sampling.

As described above, the 4:2:0 sampling technique is a sampling technique that sets the YCbCr signals of each pixel such that the Y signal as the luminance signal is held for all the pixels, but only single CbCr signals as the chrominance signals are held for every four pixels.

At the time of reproduction, for example, a chrominance signal at a pixel position where there is no chrominance signal is interpolated using a chrominance signal at an adjacent pixel position on the scanning line. A reproduced image generated by this interpolation process is the image data illustrated in (1) of FIG. 2.

(2) of FIG. 2 is a graph illustrating signal levels (pixel values) of respective Y, Cb, and Cr signals along one horizontal line (scanning line) pq in the (1) image. The abscissa axis denotes the pixel position along the horizontal line pq and the ordinate axis denotes the signal level (pixel value).

The pq line in the (1) image in FIG. 2 is constituted by an image including the sun and the sky.

In the respective YCbCr signals illustrated in (2) of FIG. 2, the luminance signal (Y) gradually increases from the left side (p side) to take a peak at the sun portion and then lowers as it goes in the right direction (q direction).

No significant change is seen in the chrominance signals (Cb and Cr) as much as the luminance signal (Y).

FIG. 3 illustrates a result of analyzing a confined micro-image region with respect to changes in the signal levels of this YCbCr signals along the pixel positions.

(1) and (2) of FIG. 3 are an image and a graph illustrating level changes of the respective YCbCr signals along the pq line, similarly to (1) and (2) of FIG. 2.

(3) of FIG. 3 represents an enlarged diagram of a region a illustrated in (2) of FIG. 3.

That is, (3) is a graph illustrating changes in the signal levels of the chrominance signals Cb and Cr in the sun portion of the (1) image in detail.

As illustrated in (3) of FIG. 3, the signal levels of the chrominance signals Cb and Cr change stepwise.

This reflects a result of directly copying Cb and Cr signal values of the adjacent pixel positions, by the interpolation process, to pixel positions missing signal values of the chrominance signals Cb and Cr because of the 4:2:0 sampling technique.

Through such a copying process, the same pixel value is set at two consecutive pixels in an image region where originally the signal level changes smoothly and, as a result, stepwise signal level changes as illustrated in (2) of FIG. 3 are produced.

Such a stepwise signal level change is recognized as a striped pattern, that is, banding, in a case where the image is observed.

As described above, in the case of outputting the subsampled image, such as display or printing, it is necessary to perform the interpolation process to set the CbCr signals at pixel positions missing the chrominance signals CbCr signals and, due to this interpolation process, a striped pattern in which the color changes stepwise, namely, so-called banding, is produced, which causes a difficulty of degradation in image quality.

Hereinafter, a configuration and a process of the present disclosure, which decrease such degradation in image quality, will be described.

[2. About Configuration and Process of Image Processing Apparatus of Present Disclosure]

An image processing apparatus of the present disclosure executes an image process that solves the difficulties described with reference to FIG. 3, for example.

Specifically, in an image signal made up of the luminance signal and the chrominance signals, such as a YCbCr (alternatively, YPbPr or YUV) image signal, an image signal in which the chrominance signals are thinned out into one signal in units of a plurality of pixels, instead of units of one pixel, that is, a subsampled image, is input and an output image in which each signal of YCbCr is set for all pixels of this input image is generated.

Note that, as described earlier, the YCbCr signals, the YPbPr signals, and the YUV signals are all similar images made up of the luminance signal and the chrominance signals. Hereinafter, a processing example for the YCbCr image signal will be described. However, the process of the present disclosure, which will be described below, can be similarly applied to the YPbPr and YUV signals and exert similar effects.

As described above, the image processing apparatus of the present disclosure solves the difficulties produced during the conventional interpolation process for the subsampled image.

That is, a high-quality output image with less degradation in image quality with decreased banding produced during the interpolation process, which has been described earlier with reference to FIG. 3, is generated.

A process executed by the image processing apparatus of the present disclosure will be described with reference to FIG. 4 and the following drawings.

FIG. 4 is a diagram illustrating a configuration example of the image processing apparatus of the present disclosure.

As illustrated in FIG. 4, the image processing apparatus 100 has a color space conversion unit 101, a signal correction unit 102, and an output signal generation unit 103.

The image processing apparatus 100 is an image for output generated on the basis of the YCbCr subsampled image as an input image 11. For example, this image is an image generated by copying adjacent CbCr pixel values to pixel positions where CbCr pixel values are not set, on the basis of the subsampled image such as the 4:2:2 subsampled image or the 4:2:0 subsampled image described above with reference to FIGS. 1A, 1B, 1C, 2, and 3.

As for the luminance signal (Y), original pixel values are set for all the pixels. As for the chrominance signals (Cb and Cr), however, copied pixel values are set for about half or less than half of pixels.

Therefore, the image is an image of low quality in which the banding described above with reference to FIG. 3 is produced.

This input image 11 is input to the color space conversion unit 101. The color space conversion unit 101 executes color space conversion that converts a YCbCr color space of the input image 11 into an RGB color space and generates an RGB image signal 12.

Note that a specific process of each processing unit will be described later with reference to FIG. 5 and the following drawings.

The RGB image 12 is input to the signal correction unit 102.

Note that the RGB image 12 is an image generated on the basis of a subsampled YCbCr image which is the input image 11, and RGB values of a part of image constituting pixels are set as pixel values obtained by directly copying pixel values of adjacent pixels.

That is, the RGB image 12 input to the signal correction unit 102 is a low-quality image having the banding phenomenon described with reference to FIG. 3.

The signal correction unit 102 executes image correction on this RGB image 12 of low quality to generate an RGB image of high quality with decreased banding.

That is, a high-quality RGB image (Rout, Gout, Bout) 13 illustrated in FIG. 4 is generated and output.

The high-quality RGB image 13 is input to the output signal generation unit 103.

The output signal generation unit 103 executes a color space conversion process that converts the RGB color space of the high-quality RGB image 123 into the YCbCr color space.

That is, a high-quality YCbCr image (Yout, Cbout, Crout) 14 illustrated in FIG. 4 is generated and output.

This high-quality YCbCr image 14 is an image of high quality in which the panding present in the initial input image 11 is decreased.

Hereinafter, specific examples of processes executed by the color space conversion unit 101, the signal correction unit 102, and the output signal generation unit 103 of the image processing apparatus 100 illustrated in FIG. 4 will be sequentially described.

[2-1. about Process Executed by Color Space Conversion Unit]

First, a process executed by the color space conversion unit 101 of the image processing apparatus 100 illustrated in FIG. 4 will be described with reference to FIG. 5.

As described with reference to FIG. 4, the image processing apparatus 100 accepts an input of the YCbCr subsampled image as the input image 11. For example, this image is an image generated by copying adjacent CbCr pixel values to pixel positions where CbCr pixel values are not set, on the basis of the subsampled image such as the 4:2:2 subsampled image or the 4:2:0 subsampled image described above with reference to FIGS. 1A, 1B, 1C, 2, and 3.

As for the luminance signal (Y), original pixel values are set for all the pixels. As for the chrominance signals (Cb and Cr), however, copied pixel values are set for about half or less than half of pixels.

Therefore, the image is an image of low quality in which the banding described above with reference to FIG. 3 is produced.

This input image 11 is input to the color space conversion unit 101. The color space conversion unit 101 executes color space conversion that converts the YCbCr color space of the input image 11 into the RGB color space and generates the RGB image signal 12.

This color space conversion process is executed, for example, by matrix conversion.

Figure 5:
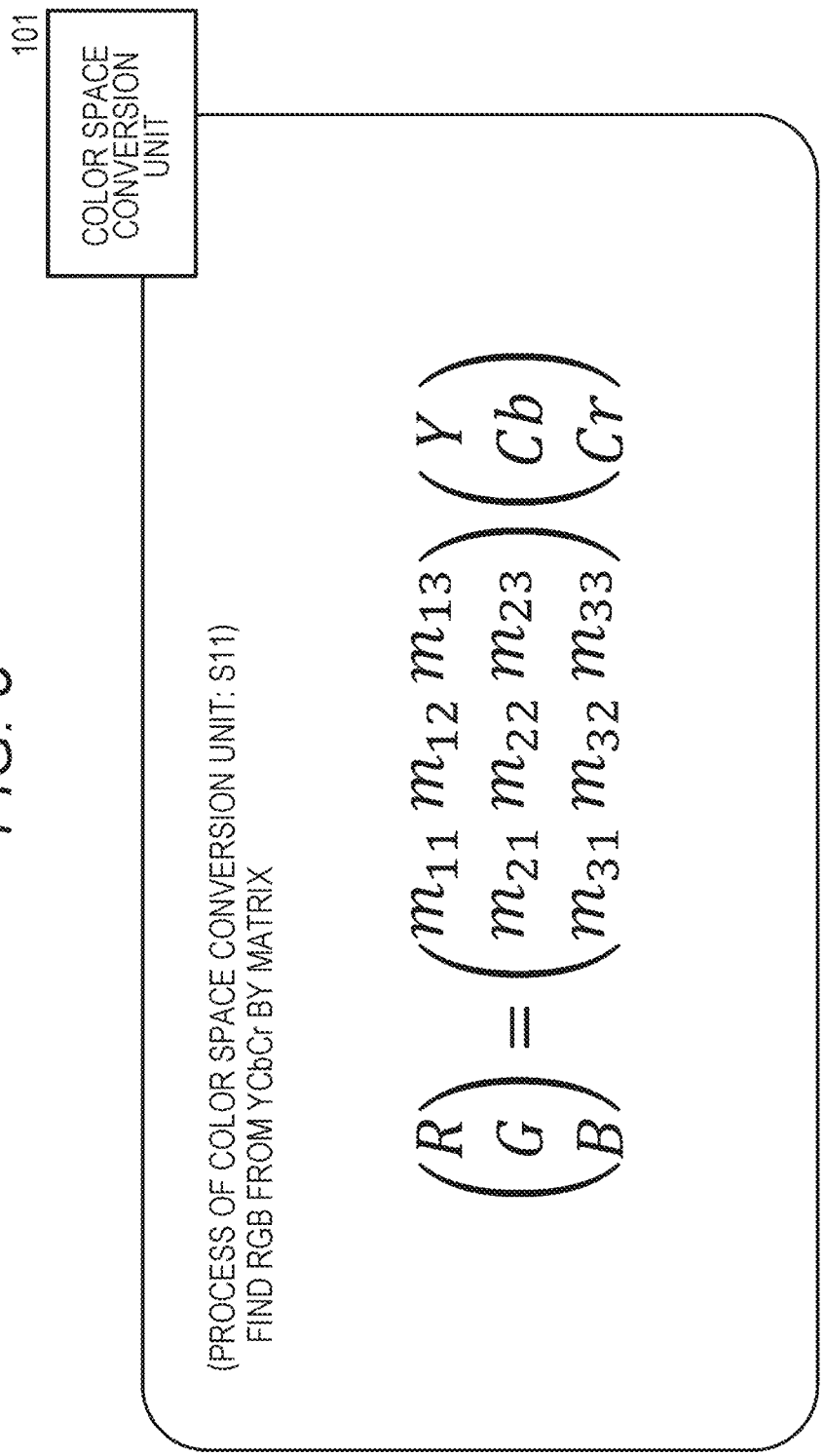
FIG. 5 is a diagram for explaining a process executed by a color space conversion unit of the image processing apparatus of the present disclosure.

Specifically, a color space conversion process by an arithmetic process using a matrix illustrated in FIG. 5 and following (Formula 1) is executed.

[Mathematical Formula 1]

$$\begin{pmatrix} R \\ G \\ B \end{pmatrix} = \begin{pmatrix} m_{11} & m_{12} & m_{13} \\ m_{21} & m_{22} & m_{23} \\ m_{31} & m_{32} & m_{33} \end{pmatrix} \begin{pmatrix} Y \\ Cb \\ Cr \end{pmatrix} \quad \text{(Formula 1)}$$

Note that a conventionally known existing matrix for color space conversion process can be applied as a matrix applied to above (Formula 1) and known values can also be applied to respective coefficients m11 to m33. However, different matrices are applied depending on the color space and the conversion technique to be used.

For example, a matrix in following (Formula 2) is used for conversion in accordance with the ITU-R BT.709 technique.

[Mathematical Formula 2]

$$\begin{pmatrix} R \\ G \\ B \end{pmatrix} = \begin{pmatrix} 1 & 0 & 1.5748 \\ 1 & -0.1873 & -0.4681 \\ 1 & 1.8556 & 0 \end{pmatrix} \begin{pmatrix} Y \\ Cb \\ Cr \end{pmatrix} \quad \text{(Formula 2)}$$

The matrix indicated by above (Formula 2) is a matrix defined in ITU-R BT.709 and a variety of other matrices are applied depending on the color space and the conversion technique to be applied.

In this manner, the color space conversion unit 101 executes color space conversion that converts the YCbCr color space of the input image 11 into the RGB color space and generates the RGB image signal 12.

The RGB image 12 is input to the signal correction unit 102.

[2-2. About Process Executed by Signal Correction Unit]

Next, a specific example of a process executed by the signal correction unit 102 will be described with reference to FIG. 6 and the following drawings.

As described with reference to FIG. 4, the RGB image 12 generated by the color space conversion unit 101 is an image generated on the basis of the subsampled YCbCr image as the input image 11 and RGB values of a part of image constituting pixels are set as pixel values obtained by directly copying pixel values of adjacent pixels.

That is, the RGB image 12 input to the signal correction unit 102 is a low-quality image in which the banding described with reference to FIG. 3 appears.

The signal correction unit 102 executes image correction on this RGB image 12 of low quality to generate an RGB image of high quality with decreased banding.

That is, the high-quality RGB image (Rout, Gout, Bout) 13 illustrated in FIG. 4 is generated and output.

The process executed by the signal correction unit 102 will be described with reference to FIGS. 6 to 11.

Figure 11:
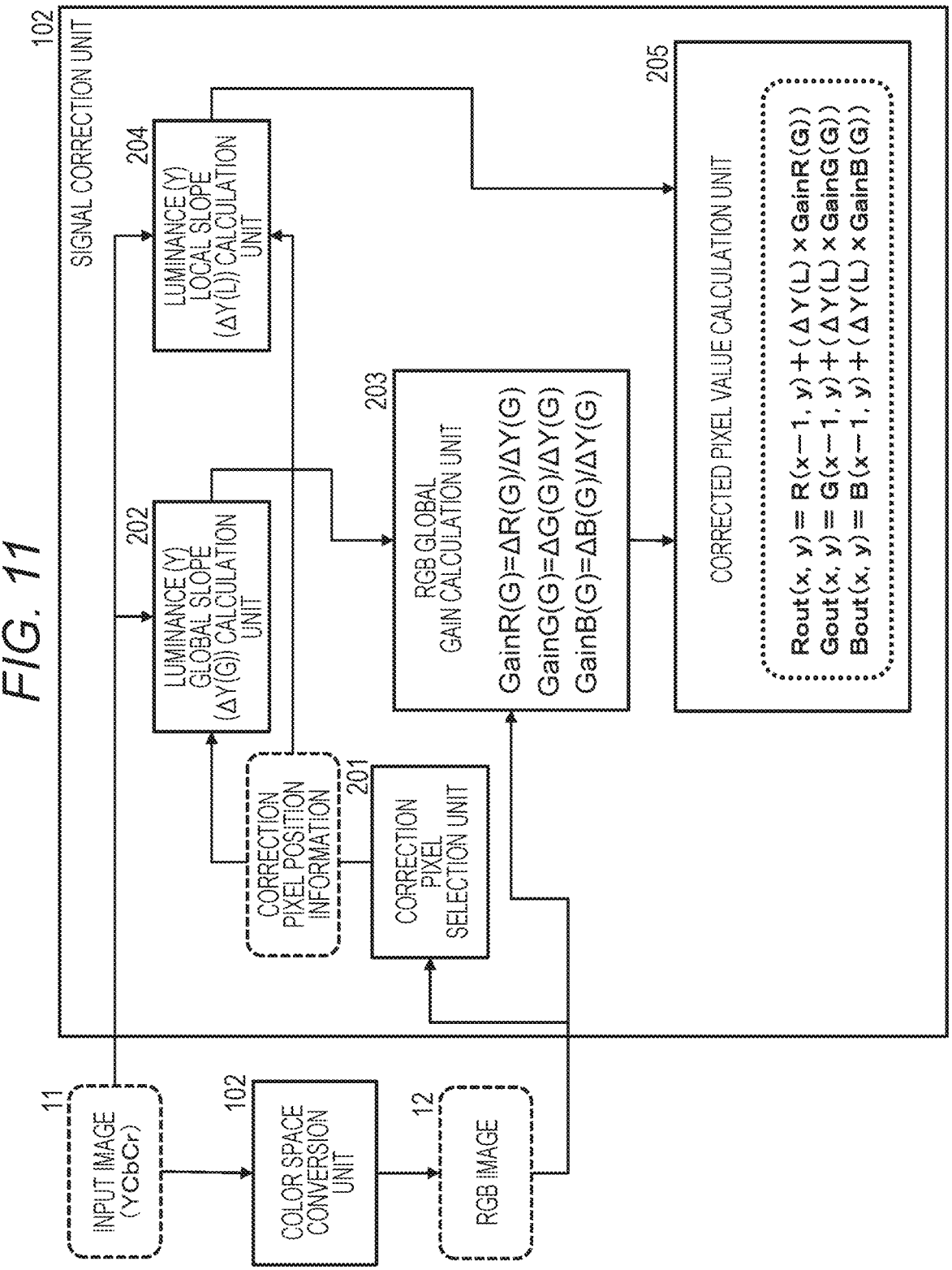
FIG. 11 is a diagram for explaining a process executed by the signal correction unit of the image processing apparatus of the present disclosure.

FIGS. 6 to 10 are diagrams for explaining the process executed by the signal correction unit 102 as time-series processing steps. FIG. 11 is a diagram for explaining an exception process.

First, processing steps executed by the signal correction unit 102 will be sequentially described with reference to FIGS. 6 to 10.

(Step S21)

A process in step S21, which is a first processing step executed by the signal correction unit 102, will be described with reference to FIG. 6.

Note that the signal correction unit 102 accepts inputs of the YCbCr image which is the input image 11 and the RGB image 12 which is an image generated by the color space conversion unit 101, to perform the process.

The signal correction unit 102 executes correction on RGB pixel values of the RGB image 12 which is an image generated by the color space conversion unit 101.

Correction target pixels are selected one by one from the RGB image 12 and a correction process for RGB pixel values is executed for the selected correction target pixel.

Figure 6:
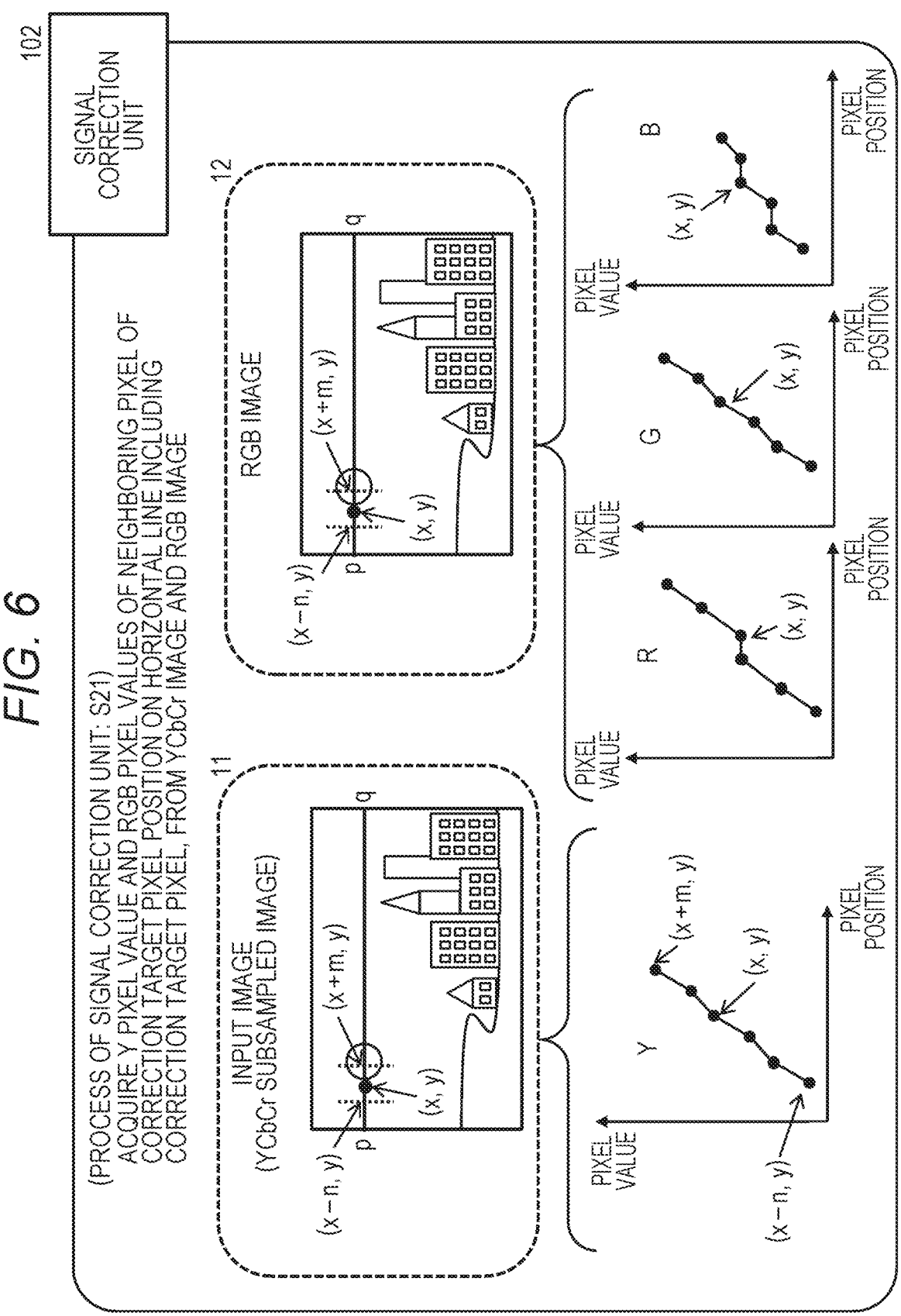
FIG. 6 is a diagram for explaining a process executed by a signal correction unit of the image processing apparatus of the present disclosure.

As illustrated in FIG. 6, in step S21, the signal correction unit 102 first acquires a Y pixel value and RGB pixel values of a neighboring pixel of the correction target pixel position on a horizontal line including the correction target pixel, from the YCbCr image which is the input image 11 and the RGB image 12 which is an image generated by the color space conversion unit 101.

Note that, in the example illustrated in FIG. 6, the correction target pixel is assumed to be a pixel at coordinates (x, y) on a horizontal line PQ of the RGB image 12.

As illustrated in FIG. 6, the horizontal line pq including the correction target pixel of the RGB image 12 which is an image generated by the color space conversion unit 101 is selected and a reference pixel region (global region) is set on the left and right sides of the correction target pixel (x, y) such that pixel values (RGB) of pixels at (x−n, y) to (x+m, y) are acquired.

Furthermore, also for the input image (subsampled YCbCr image) 11, the signal correction unit 102 acquires luminance values (Y) of pixels at (x−n, y) to (x+m, y) in the reference pixel region on the left and right sides of the correction target pixel (x, y) on the horizontal line pq.

Note that, although the range of the reference pixel region (global region) of the correction target pixel (x, y) on the horizontal line can be set in a variety of ways, for example, a pixel region having about 10 pixels centered on the correction target pixel (x, y) is assigned as a reference region.

Four graphs illustrated in the lower part of FIG. 6 are graphs of the luminance value (Y) acquired from the input image 11 and the RGB pixel values acquired from the RGB image 12 which is an image generated by the color space conversion unit 101.

In each of the graphs, the pixel position is set on the abscissa axis and the pixel value is set on the ordinate axis.

Pixel values of respective pixels at (x−n, y) to (x+m, y) in the reference pixel region on the left and right sides of the correction target pixel (x, y) on the horizontal line pq are illustrated as graphs.

As indicated by the input image 11 and the RGB image 12 in FIG. 6, the correction target pixel (x, y) is at a pixel position on the left side of the sun and, in the graphs, the pixel values of respective Y and RGB at a left end (x−n, y) to a right end (x+m, y) of the reference pixel region progressively rise.

However, in the graphs of R and B illustrated in FIG. 6, there are pixels having approximately the same pixel value at two consecutive pixel positions.

This is due to the fact that pixel values of R and B are generated using the copied pixel values from chrominance information CbCr of the input image which is a subsampled image, that is, the subsampled YCbCr image.

Note that the G pixel value does not indicate a flat signal transition like R and B pixels. This is because, in the signal conversion from YCbCr to RGB using above-mentioned (Formula 1) by the color space conversion unit 101 described above, calculation is performed by setting the G pixel value to have a higher contribution ratio of the luminance (Y) signal than those of the RB pixels.

On the other hand, since the RB pixels have higher contribution ratios of the CbCr signals, signal flat portions based on the copied pixel values, which are initially present in the CbCr signals, are directly reflected.

This signal flat portion represents the stepwise pixel value change described with reference to (3) of FIG. 3 and is a main cause for the banding phenomenon.

(Step S22)

Next, a process in step S22, which is a next processing step executed by the signal correction unit 102, will be described with reference to FIG. 7.

In step S22, the signal correction unit 202 calculates pixel value change ratios (global slopes) [$\Delta Y(G)$, $\Delta R(G)$, $\Delta G(G)$, $\Delta B(G)$] of a neighboring pixel of the correction target pixel (x, y) on the horizontal line.

Furthermore, for each of the RGB pixels, a ratio of the global slope with respect to the luminance Y (global gain) [$GainR(G)$, $GainG(G)$, $GainB(G)$] is calculated.

Figure 7:
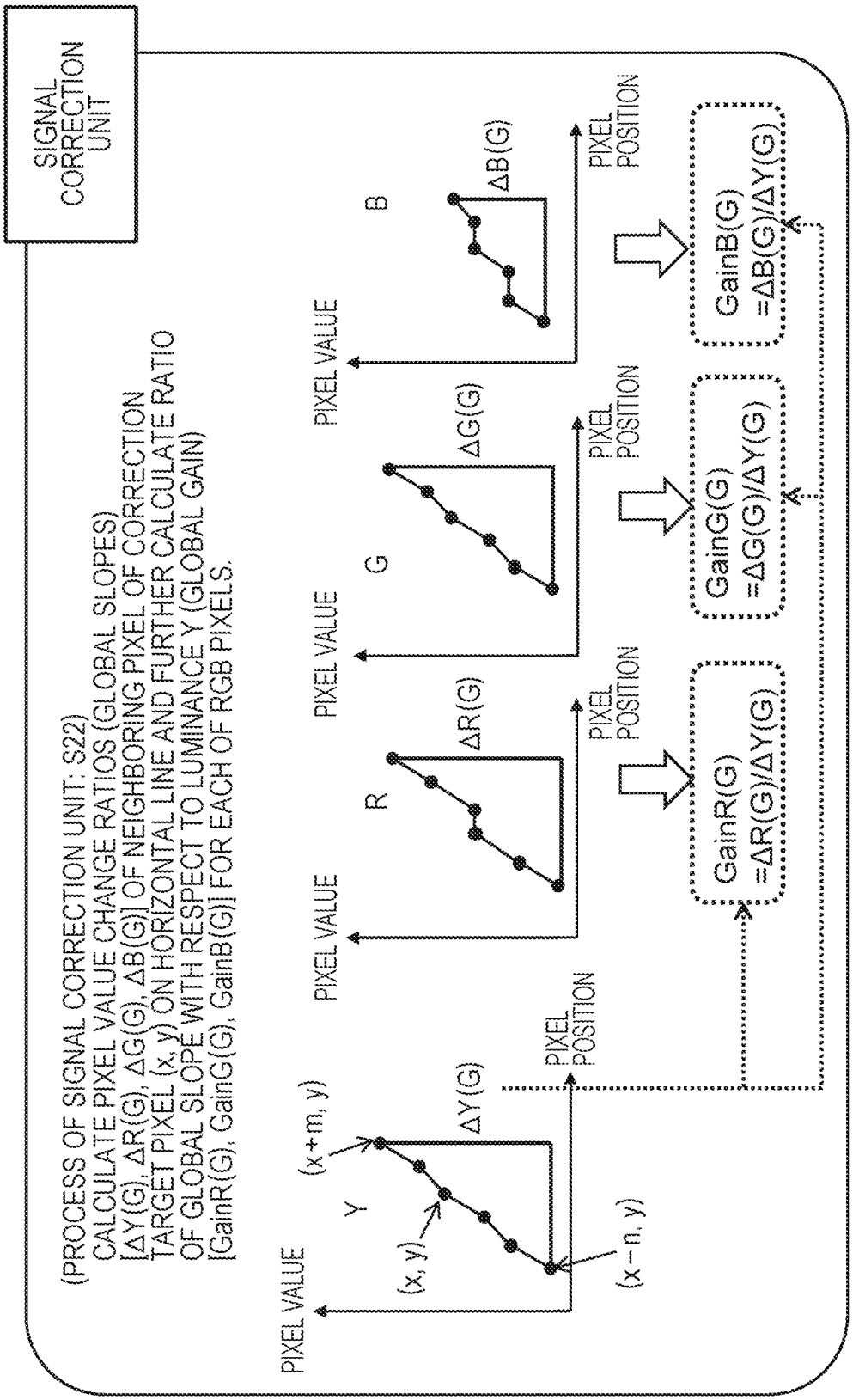
FIG. 7 is a diagram for explaining a process executed by the signal correction unit of the image processing apparatus of the present disclosure.

FIG. 7 illustrates graphs similar to those illustrated in FIG. 6.

These graphs are graphs of the luminance value (Y) acquired from the input image 11 and the RGB pixel values acquired from the RGB image 12 which is an image generated by the color space conversion unit 101.

In each of the graphs, the pixel position is set on the abscissa axis and the pixel value is set on the ordinate axis.

Pixel values of respective pixels at (x−n, y) to (x+m, y) in the reference pixel region on the left and right sides of the correction target pixel (x, y) on the horizontal line pq are illustrated as graphs.

On the basis of these pixel values of the reference pixels (x−n, y) to (x+m, y) in the global region on the same horizontal line as the correction target pixel (x, y), the signal correction unit calculates the pixel value change ratios (global slopes).

The pixel value change ratios (global slopes) are ΔY(G), ΔR(G), ΔG(G), and ΔB(G) in the graphs in FIG. 7.

Specifically, for example, a difference between pixel values of two pixels at both ends of the reference region can be calculated as the pixel value change ratio (global slope) [ΔY(G), ΔR(G), ΔG(G), ΔB(G)].

For example, in a case where a reference region having 10 pixels is set, a difference between pixel values at both ends of these 10 pixels is calculated as the pixel value change ratio (global slope) [ΔY(G), ΔR(G), ΔG(G), ΔB(G)].

Furthermore, as illustrated in FIG. 7, the signal correction unit 102 calculates a ratio of the global slope with respect to the luminance Y (global gain) [GainR(G), GainG(G), GainB(G)] for each of the RGB pixels.

Specifically, the global gains corresponding to RGB are calculated in accordance with the following formulas.

GainR(G)=ΔR(G)/ΔY(G)

GainG(G)=ΔG(G)/ΔY(G)

GainB(G)=ΔB(G)/ΔY(G)

As can be understood from the above formulas, each of the global gains corresponding to RGB represents a ratio between a slope of pixel values (pixel value difference) of the luminance value (Y) and a slope of pixel values (pixel value difference) of each of the RGB pixels in the reference region.

(Step S23)

Next, a process in step S23, which is a next processing step executed by the signal correction unit 102, will be described with reference to FIGS. 8 to 10.

Figure 8:
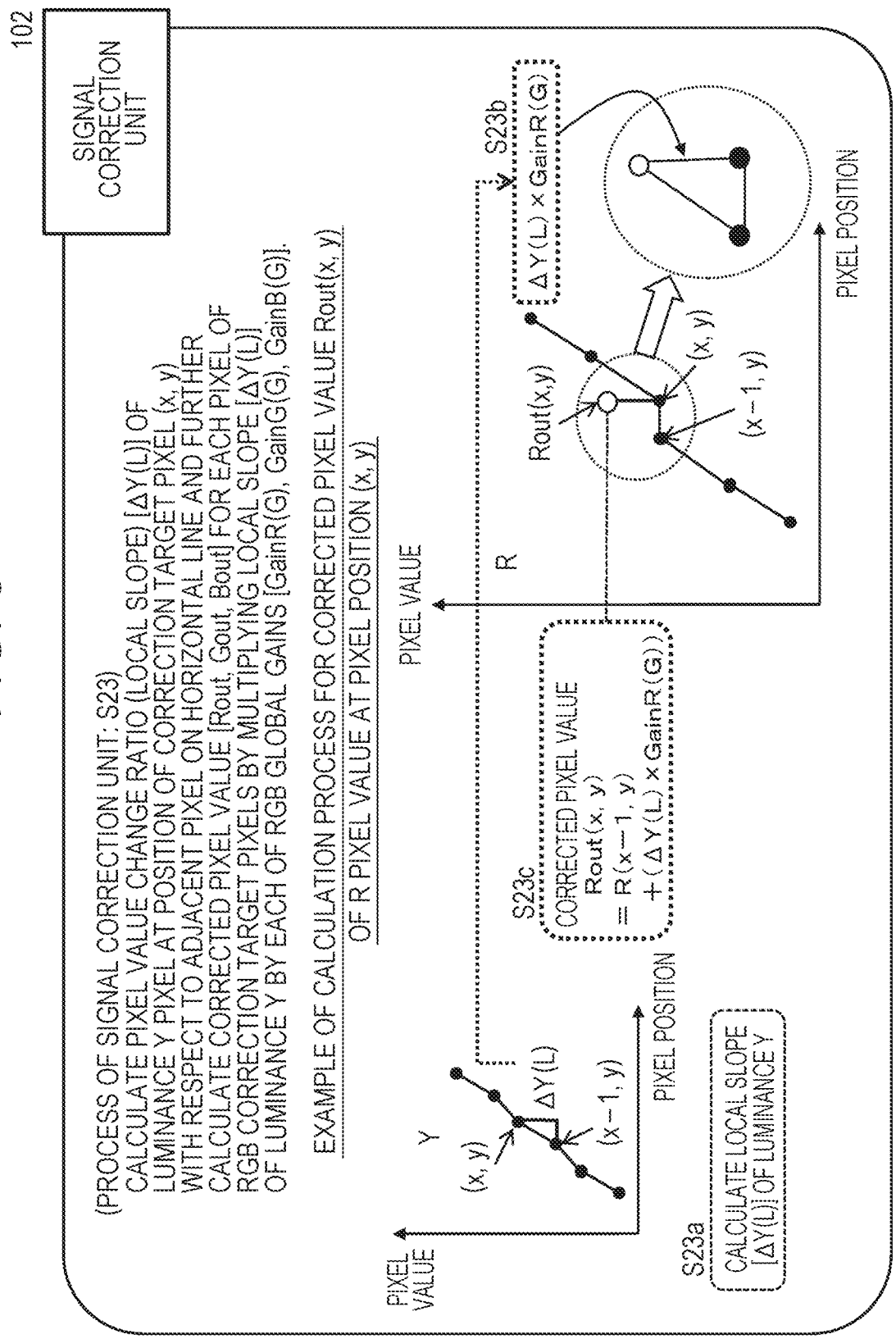
FIG. 8 is a diagram for explaining a process executed by the signal correction unit of the image processing apparatus of the present disclosure.
Figure 9:
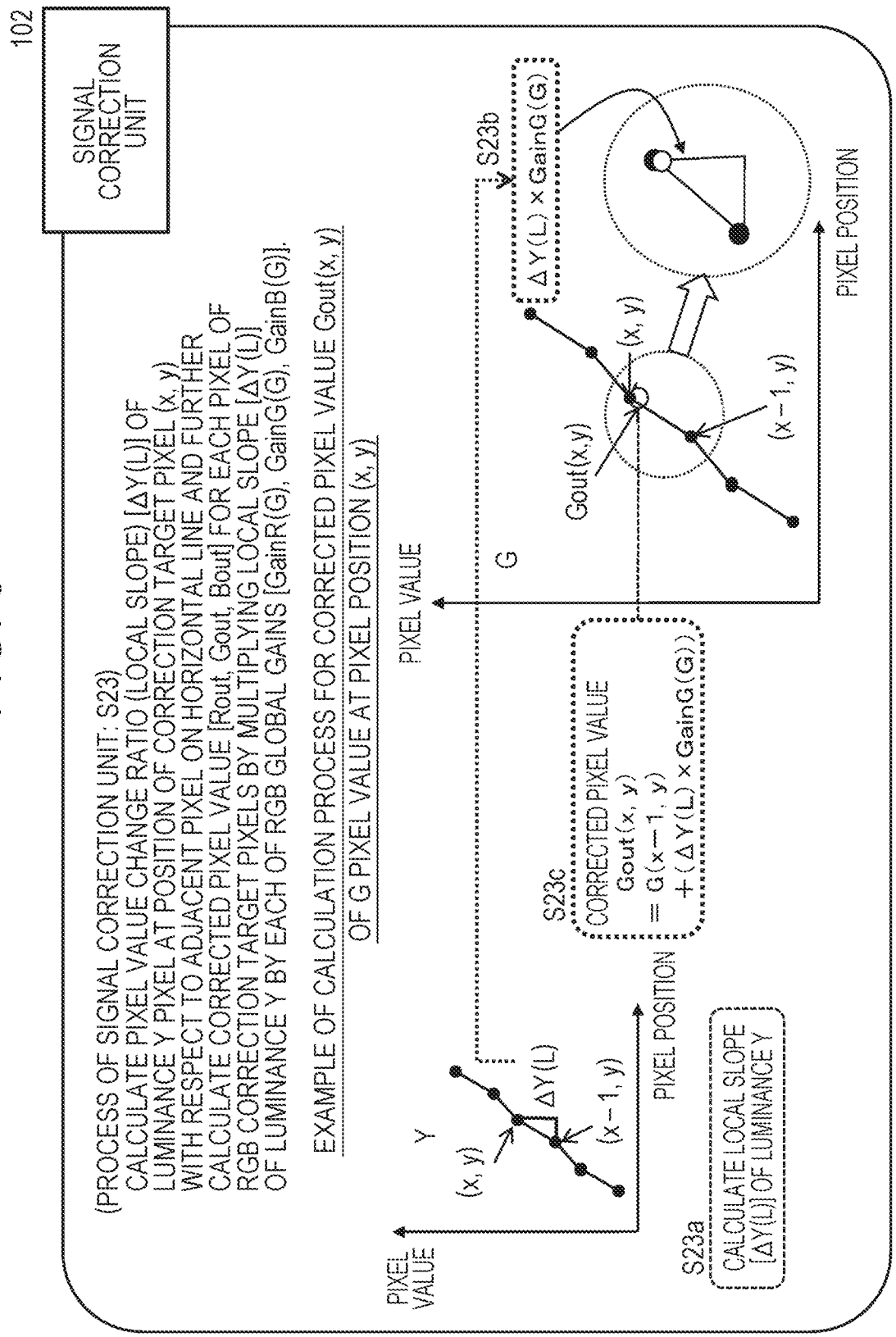
FIG. 9 is a diagram for explaining a process executed by the signal correction unit of the image processing apparatus of the present disclosure.

The process illustrated in FIGS. 8 to 10 is a calculation process for corrected pixel values (Rout, Gout, Bout) of the correction target pixel (x, y) executed by the signal correction unit 102.

FIG. 8 is a diagram for explaining a calculation process for the corrected pixel value Rout.

FIG. 9 is a diagram for explaining a calculation process for the corrected pixel value Gout.

FIG. 10 is a diagram for explaining a calculation process for the corrected pixel value Bout.

The signal correction unit 102 calculates a pixel value change ratio (local slope) [ΔY(L)] between the luminance Y at the position of the correction target pixel (x, y) and the luminance Y of an adjacent pixel (x−1, y) on the same horizontal line.

Note that the local slope is a pixel value change ratio (local slope) [ΔY(L)] of a local region which is a region within the above-described reference region (global region) and smaller than the global region.

Specifically, for example, it is possible to calculate a difference between the luminance Y of the correction target pixel (x, y) and the luminance Y of the adjacent pixel (x−1, y) as the pixel value change ratio (local slope) [ΔY(L)].

Furthermore, for each pixel of the RGB correction target pixels, the local slope [ΔY(L)] of the luminance Y is multiplied by each of the RGB global gains [GainR(G), GainG(G), GainB(G)], to calculate the corrected pixel value [Rout, Gout, Bout].

First, the calculation process for the corrected pixel value Rout will be described with reference to FIG. 8.

Three processing steps S23a, S23b, and S23c executed by the signal correction unit 102 are illustrated in the lower portion of FIG. 8.

First, in step S23a, the signal correction unit 102 acquires the luminance Y at the position of the correction target pixel (x, y) and the luminance Y of the adjacent pixel on the same horizontal line and calculates the pixel value change ratio (local slope) [ΔY(L)] between these two items of the luminance.

In the example illustrated in FIG. 8, the correction target pixel (x, y) and the adjacent pixel (x−1, y) on the same horizontal line are selected and a difference between pixel values (luminance values (Y)) of these two pixels is calculated as the local slope [ΔY(L)] of the luminance (Y).

Furthermore, in step S23b, the signal correction unit 102 multiplies the local slope [ΔY(L)] of the luminance Y by the R global gain [GainR(G)] to calculate local application data of the global gain for the correction target pixel (x, y).

As illustrated in step S23b in FIG. 8, the multiplication value, that is, the global gain local application data is calculated by the following arithmetic expression.

Global gain local application data=ΔY(L)×GainR(G)

This multiplication result represents a difference between the corrected pixel value Rout(x, y) of the correction target pixel (x, y) and the R pixel value of the adjacent pixel (x−1, y), as illustrated in FIG. 8.

Furthermore, in step S23c, the signal correction unit 102 calculates the corrected pixel value Rout(x, y) of the correction target pixel (x, y) in accordance with the following formula.

Rout(x,y)=R(x−1,y)+(ΔY(L)×GainR(G))

The above-described corrected pixel value calculation formula is a calculation formula that adds the global gain local application data [ΔY(L)×GainR(G)] to the R pixel value [R(x−1, y)] of the adjacent pixel (x−1, y) of the correction target pixel (x, y).

The corrected pixel value Rout(x, y) of the correction target pixel (x, y) is calculated by this addition formula.

Next, the calculation process for the corrected pixel value Gout will be described with reference to FIG. 9.

Three processing steps S23a, S23b, and S23c executed by the signal correction unit 102 are illustrated in the lower portion of FIG. 9.

First, in step S23a, the signal correction unit 102 acquires the luminance Y at the position of the correction target pixel (x, y) and the luminance Y of the adjacent pixel on the same horizontal line and calculates the pixel value change ratio (local slope) [ΔY(L)] between these two items of the luminance.

In the example illustrated in FIG. 9, the correction target pixel (x, y) and the adjacent pixel (x−1, y) on the same horizontal line are selected and a difference between pixel values (luminance values (Y)) of these two pixels is calculated as the local slope [ΔY(L)] of the luminance (Y).

Furthermore, in step S23b, the signal correction unit 102 multiplies the local slope [ΔY(L)] of the luminance Y by the G global gain [GainG(G)] to calculate local application data of the global gain for the correction target pixel (x, y).

As illustrated in step S23b in FIG. 9, the multiplication value, that is, the global gain local application data is calculated by the following arithmetic expression.

Global gain local application data=ΔY(L)×GainG(G)

This multiplication result represents a difference between the corrected pixel value Gout(x, y) of the correction target pixel (x, y) and the G pixel value of the adjacent pixel (x−1, y), as illustrated in FIG. 9.

Furthermore, in step S23$c$, the signal correction unit 102 calculates the corrected pixel value Gout(x, y) of the correction target pixel (x, y) in accordance with the following formula.

$$\text{Gout}(x,y)=G(x-1,y)+(\Delta Y(L)\times \text{Gain}G(G))$$

The above-described corrected pixel value calculation formula is a calculation formula that adds the global gain local application data [$\Delta Y(L)\times \text{Gain}G(G)$] to the G pixel value [$G(x-1, y)$] of the adjacent pixel (x−1, y) of the correction target pixel (x, y).

The corrected pixel value Gout(x, y) of the correction target pixel (x, y) is calculated by this addition formula.

Next, the calculation process for the corrected pixel value Bout will be described with reference to FIG. 10.

Three processing steps S23$a$, S23$b$, and S23$c$ executed by the signal correction unit 102 are illustrated in the lower portion of FIG. 10.

First, in step S23$a$, the signal correction unit 102 acquires the luminance Y at the position of the correction target pixel (x, y) and the luminance Y of the adjacent pixel on the same horizontal line and calculates the pixel value change ratio (local slope) [$\Delta Y(L)$] between these two items of the luminance.

In the example illustrated in FIG. 10, the correction target pixel (x, y) and the adjacent pixel (x−1, y) on the same horizontal line are selected and a difference between pixel values (luminance values (Y)) of these two pixels is calculated as the local slope [$\Delta Y(L)$] of the luminance (Y).

Furthermore, in step S23$b$, the signal correction unit 102 multiplies the local slope [$\Delta Y(L)$] of the luminance Y by the B global gain [Gain$B(G)$] to calculate local application data of the global gain for the correction target pixel (x, y).

As illustrated in step S23$b$ in FIG. 10, the multiplication value, that is, the global gain local application data is calculated by the following arithmetic expression.

$$\text{Global gain local application data}=\Delta Y(L)\times \text{Gain}B(G)$$

This multiplication result represents a difference between the corrected pixel value Bout(x, y) of the correction target pixel (x, y) and the B pixel value of the adjacent pixel (x−1, y), as illustrated in FIG. 10.

Furthermore, in step S23$c$, the signal correction unit 102 calculates the corrected pixel value Bout(x, y) of the correction target pixel (x, y) in accordance with the following formula.

$$\text{Bout}(x,y)=B(x-1,y)+(\Delta Y(L)\times \text{Gain}B(G))$$

The above-described corrected pixel value calculation formula is a calculation formula that adds the global gain local application data [$\Delta Y(L)\times \text{Gain}B(G)$] to the B pixel value [$B(x-1, y)$] of the adjacent pixel (x−1, y) of the correction target pixel (x, y).

The corrected pixel value Bout(x, y) of the correction target pixel (x, y) is calculated by this addition formula.

In this manner, the signal correction unit 102 generates an RGB image with decreased banding, that is, the high-quality RGB image (Rout, Gout, Bout) 13 illustrated in FIG. 4, and inputs this high-quality RGB image 13 to the output signal generation unit 103.

The processes in steps S21 to S23 executed by the signal correction unit 102 described with reference to FIGS. 6 to 10 will be summarized and described with reference to FIG. 11.

FIG. 11 is a diagram illustrating the detailed configuration of the signal correction unit 102.

As illustrated in FIG. 11, the signal correction unit 102 has a correction pixel selection unit 201, a luminance (Y) global slope ($\Delta Y(G)$) calculation unit 202, an RGB global gain calculation unit 203, a luminance (Y) local slope ($\Delta Y(L)$) calculation unit 204, and a corrected pixel value calculation unit 205.

The input image 11 which is a subsampled YCbCr image and the RGB image 12 generated through the color space conversion process for the input image 11 by the color space conversion unit 102 are input to the signal correction unit 102.

First, the correction pixel selection unit 201 sequentially selects correction target pixels from the RGB image 12 generated by the color space conversion process.

Note that, as for the correction target pixels, all the pixels of the constituent pixels of the RGB image generated by the color space conversion unit 101 are sequentially selected as targets.

However, for example, in a case where copied pixel value setting positions of CbCr are recorded to attribute information on the input image as constituent pixel information on the input YCbCr image which is the subsampled image, copied pixel position information may be acquired from the attribute information such that only those pixel positions are selected as processing targets.

Note that, in the following description, a correction pixel selected by the correction pixel selection unit 201 is assumed as the correction target pixel (x, y).

The luminance (Y) global slope ($\Delta Y(G)$) calculation unit 202 executes the process in step S21 described with reference to FIG. 6.

That is, the following process is executed.

(Step S21)

The global slopes [$\Delta Y(G)$, $\Delta R(G)$, $\Delta G(G)$, $\Delta B(G)$] of pixel values, namely, the luminance value (Y) and the pixel values (RGB), are calculated by applying a broad reference region (for example, about 10 pixels) around the correction target pixel (x, y).

The RGB global gain calculation unit 203 executes the process in step S22 described with reference to FIG. 7.

That is, the following process is executed.

(Step S22)

The global gain which is a ratio between global slopes of two items, namely, the luminance value (Y) and the pixel value (R), is calculated.

$$\text{Gain}R(G)=\Delta R(G)/\Delta Y(G)$$

$$\text{Gain}G(G)=\Delta G(G)/\Delta Y(G)$$

$$\text{Gain}B(G)=\Delta B(G)/\Delta Y(G)$$

The luminance (Y) local slope ($\Delta Y(L)$) calculation unit 204 executes the process in step S23$a$ described with reference to FIGS. 8 to 10.

That is, the following process is executed.

(Step S23$a$)

The luminance Y at the position of the correction target pixel (x, y) and the luminance Y of the adjacent pixel on the same horizontal line are acquired and the pixel value change ratio (local slope) [$\Delta Y(L)$] between these two items of the luminance is calculated.

The corrected pixel value calculation unit 205 executes the processes in steps S23*b* and S23*c* described with reference to FIGS. 8 to 10.

That is, the following processes are executed.

(Step S23*b*)

The local slope [ΔY(L)] of the luminance Y is multiplied by the global gains of RGB [GainR(G), GainG(G), GainB(G)] and local application data of the global gains is calculated for the correction target pixel (x, y).

ΔY(L)×GainR(G)

ΔY(L)×GainG(G)

ΔY(L)×GainB(G)

(Step S23*c*)

The corrected pixel value RGBout (x, y) is calculated by adding the global gain local application data [ΔY(L)×GainR(G), ΔY(L)×GainG(G), ΔY(L)×BainR(G)] to the RGB pixel values [R(x−1, y), G(x−1, y), B(x−1, y)] of the adjacent pixel (x−1, y) of the correction target pixel (x, y).

Rout(x,y)=R(x−1,y)+(ΔY(L)×GainR(G))

Gout(x,y)=G(x−1,y)+(ΔY(L)×GainG(G))

Bout(x,y)=B(x−1,y)+(ΔY(L)×GainB(G))

Through these processes, the signal correction unit 102 calculates corrected RGB pixel values [Rout, Gout, Bout] of the correction target pixel (x, y).

However, the signal correction unit 102 does not execute the above-described pixel value correction for some pixels constituting the image.

This exception process will be described with reference to FIG. 12.

Figure 12:
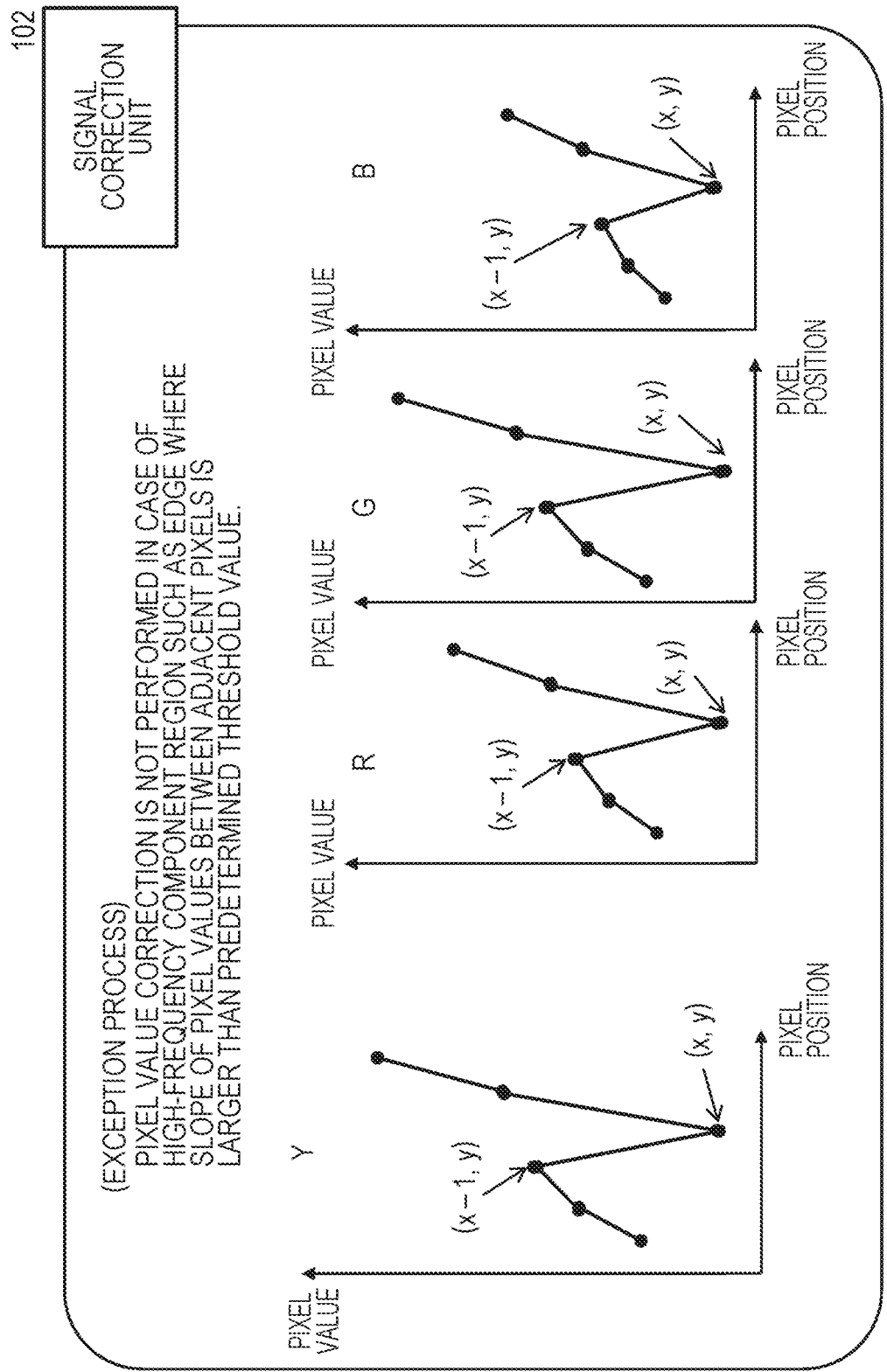
FIG. 12 is a diagram for explaining a process executed by the signal correction unit of the image processing apparatus of the present disclosure.

As illustrated in FIG. 12, the signal correction unit 102 does not perform the pixel value correction in the case of a high-frequency component region such as an edge where a slope of pixel values between adjacent pixels is larger than a predetermined threshold value.

As in a graph illustrated in FIG. 12, there are cases where pixel values (Y, R, G, B) of the correction target pixel (x, y) and pixel values (Y, R, G, B) of the adjacent pixel (x−1, y) thereof are significantly different.

Such pixel value setting indicates that there is a high possibility of an edge such as a subject boundary existing between the pixel position (x, y) and the pixel position (x−1, y).

When the pixel value correction process described with reference to FIGS. 6 to 11 is executed on a region in which such pixel values are set, it is supposed that a difference between the pixel value of the correction target pixel (x, y) and the pixel value of the adjacent pixel (x−1, y) is made small, resulting in a blurred image with unclear edges.

Therefore, the pixel value correction is set not to be executed for such pixels having a large difference of pixel values between adjacent pixels.

Specifically, for example, a threshold value Th is set in advance, and the pixel value correction described with reference to FIGS. 8 to 10 is set to be executed only in a case where a pixel value difference |K(x, y)−K(x−1, y)| of the adjacent pixels is equal to or less than the threshold value Th.

In this case, K=Y, or R, or G, or B is satisfied.

That is,

|K(x,y)−K(x−1,y)|≤Th the signal correction unit 102 determines whether or not the above determination formula is established for the correction target pixel (x, y) and executes the pixel value correction only in a case where the determination formula is established.

In this case, K=Y, or R, or G, or B is satisfied.

[2-3. About Process Executed by Output Signal Generation Unit]

Next, a process executed by the output signal generation unit 103 of the image processing apparatus 100 illustrated in FIG. 4 will be described with reference to FIG. 13.

As described with reference to FIGS. 6 to 11, the signal correction unit 102 generates an RGB image with decreased banding, that is, the high-quality RGB image (Rout, Gout, Bout) 13 illustrated in FIG. 4, to input to the output signal generation unit 103.

The output signal generation unit 103 executes color space conversion that converts the RGB color space of the high-quality RGB image 13 into the YCbCr color space and generates the high-quality YCbCr image 14.

This color space conversion process is executed, for example, by matrix conversion.

Figure 13:
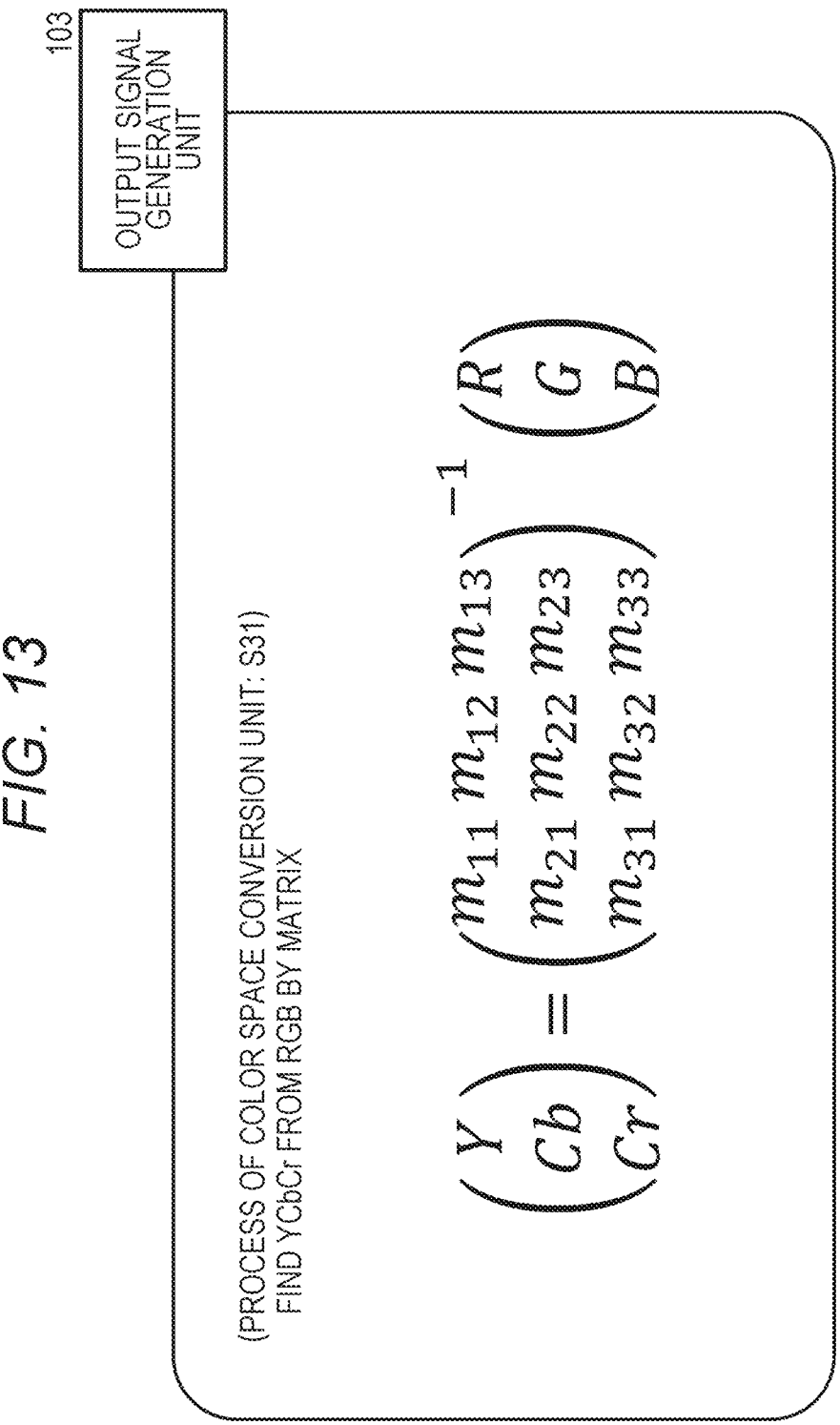
FIG. 13 is a diagram for explaining a process executed by an output signal generation unit of the image processing apparatus of the present disclosure.

Specifically, a color space conversion process by an arithmetic process using a matrix illustrated in FIG. 13 and following (Formula 3) is executed.

[Mathematical Formula 3]

$$\begin{pmatrix} Y \\ Cb \\ Cr \end{pmatrix} = \begin{pmatrix} m_{11} & m_{12} & m_{13} \\ m_{21} & m_{22} & m_{23} \\ m_{31} & m_{32} & m_{33} \end{pmatrix}^{-1} \begin{pmatrix} R \\ G \\ B \end{pmatrix} \quad \text{(Formula 3)}$$

Note that an inverse matrix of the matrix applied to the conversion process from the YCbCr color space to the RGB color space by the color space conversion unit 101 described earlier with reference to FIG. 5 can be applied as a matrix applied to the above-described (Formula 3).

A conventionally known existing matrix for color space conversion process can also be applied as a matrix applied to this (Formula 3) indicated above and known values can also be applied to respective coefficients m11 to m33.

As described above, the output signal generation unit 103 executes color space conversion that converts the RGB color space of the high-quality RGB image 13 generated by the signal correction unit 102 into the YCbCr color space and generates the high-quality YCbCr image 14 to output.

This high-quality YCbCr image 14 has color characteristics similar to color characteristics of the high-quality RGB image 13 generated by the signal correction unit 102 and is a high-quality image with decreased banding.

[3. About Image Processing Sequence Executed by Image Processing Apparatus]

Next, an image processing sequence executed by the image processing apparatus of the present disclosure will be described with reference to flowcharts illustrated in FIGS. 14 and 15.

Figure 14:
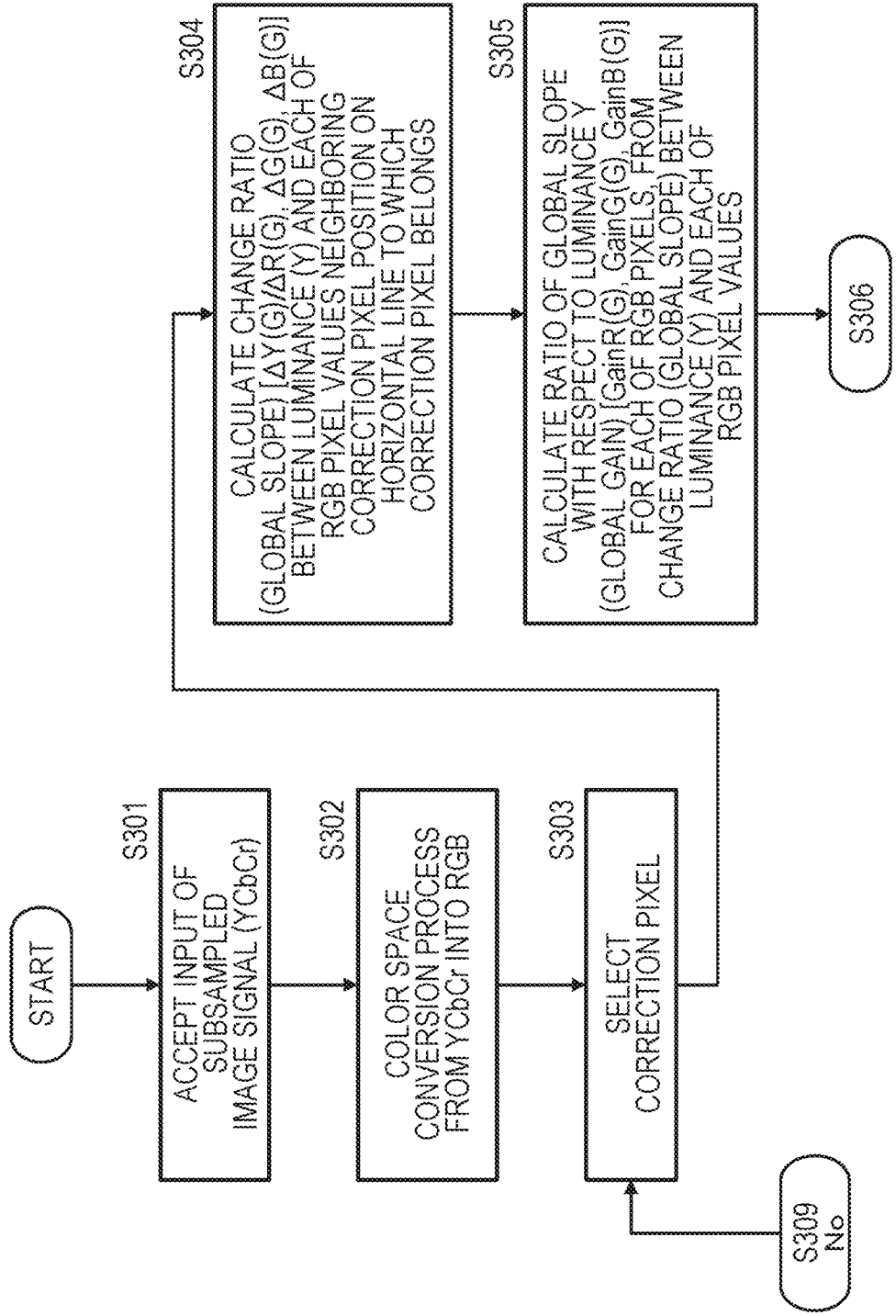
FIG. 14 is a diagram illustrating a flowchart for explaining a sequence of a process executed by the image processing apparatus of the present disclosure.
Figure 15:
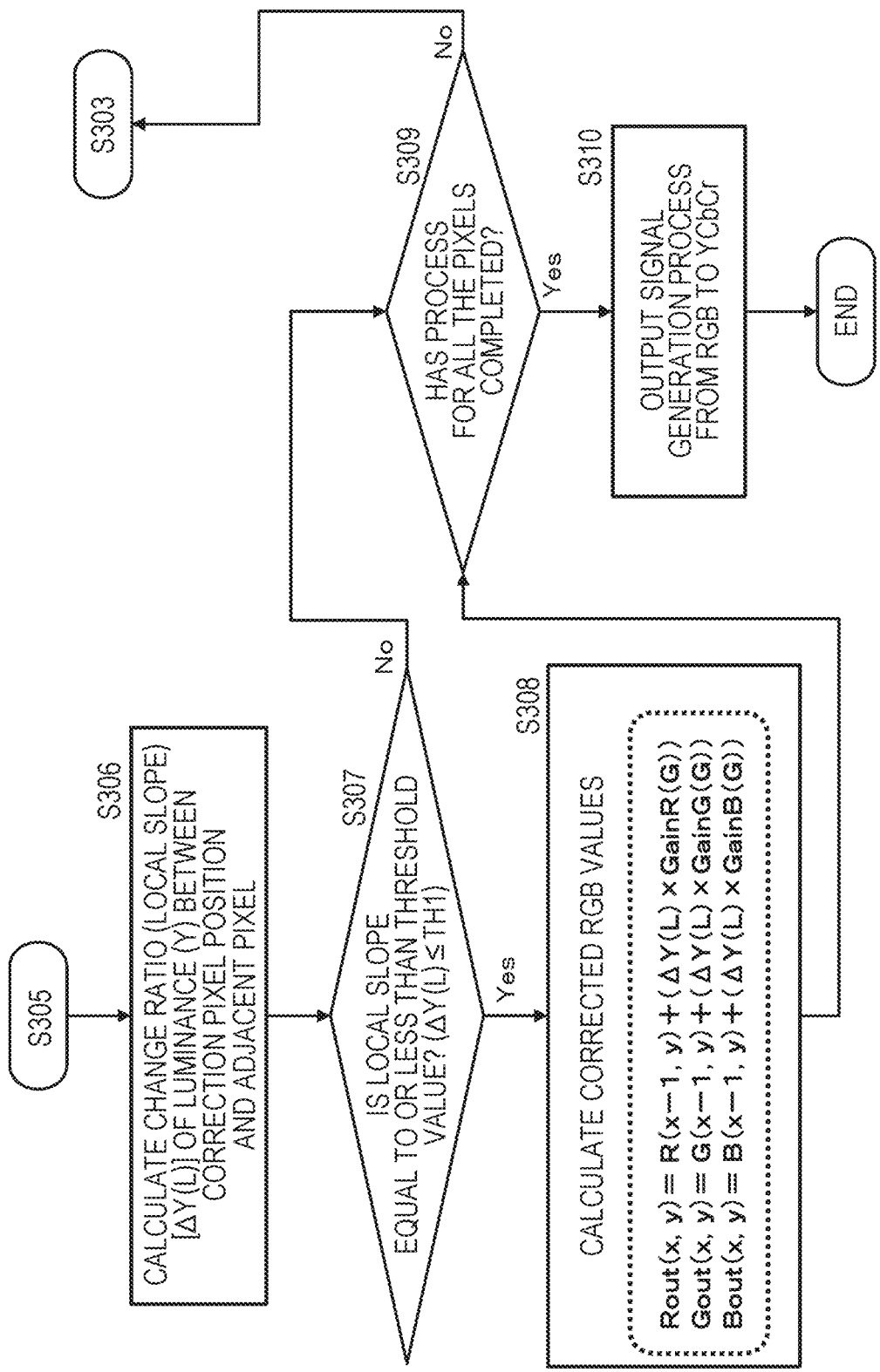
FIG. 15 is a diagram illustrating a flowchart for explaining a sequence of a process executed by the image processing apparatus of the present disclosure.

The process in accordance with the flow illustrated in FIGS. 14 and 15 is a process executed, for example, by a data processing unit of the image processing apparatus provided with a central processing unit (CPU) or the like having a program execution function, in accordance with a program saved in a memory in the image processing apparatus.

A process in each step will be described.

(Step S301)

First, in step S301, an image assigned as a processing target is input.

The input image is input to the color space conversion unit 101 of the image processing apparatus 100 illustrated in FIG. 4.

Specifically, a YCbCr image which is a subsampled image missing chrominance information is input to the color space conversion unit 101.

This image is an image generated by copying adjacent CbCr pixel values to pixel positions where CbCr pixel values are not set, on the basis of the subsampled image such as the 4:2:2 subsampled image or the 4:2:0 subsampled image described with reference to FIGS. 1A, 1B, and 1C.

As for the luminance signal (Y), original pixel values are set for all the pixels. As for the chrominance signals (Cb and Cr), however, copied pixel values are set for about half or less than half of pixels.

Therefore, the image is an image of low quality in which the banding described above with reference to FIG. 3 is produced.

(Step S302)

Next, in step S302, the color space conversion unit 101 executes color space conversion that converts the YCbCr color space of the input image into the RGB color space and generates an RGB image signal.

This color space conversion process is executed, for example, by matrix conversion.

Specifically, as described earlier with reference to FIG. 5, a color space conversion process by an arithmetic process using the matrix indicated by above-described (Formula 1) is executed.

(Step S303)

The processes in steps S303 to S309 are processes executed by the signal correction unit 102 illustrated in FIG. 4.

First, in step S303, the signal correction unit 102 selects a correction pixel from the RGB image generated by the color space conversion unit 101.

This process is a process executed by the correction pixel selection unit 201 of the signal correction unit 102 illustrated in FIG. 11.

The correction pixel selection unit 201 of the signal correction unit 102 sequentially selects all the pixels of the constituent pixels of the RGB image generated by the color space conversion unit 101, as the correction target pixels.

However, as described above, for example, in a case where copied pixel value setting positions of CbCr are recorded to attribute information on the input image as constituent pixel information on the input YCbCr image which is the subsampled image, copied pixel position information may be acquired from the attribute information such that only those pixel positions are selected as processing targets.

In the following explanation, the correction target pixel will be described as the correction target pixel (x, y).

(Steps S304 to S305)

The processes in steps S304 and S305 are processes executed by the luminance (Y) global slope calculation unit 202 and the RGB global gain calculation unit 203 of the signal correction unit 102 illustrated in FIG. 11.

The luminance (Y) global slope calculation unit 202 of the signal correction unit 102 illustrated in FIG. 11 calculates the global slopes [$\Delta Y(G)$, $\Delta R(G)$, $\Delta G(G)$, $\Delta B(G)$] of pixel values, namely, the luminance value (Y) and the pixel values (RGB), by applying a broad reference region (for example, about 10 pixels) around the correction target pixel (x, y).

Furthermore, in step S305, the RGB global gain calculation unit 203 calculates the global gain which is a ratio between global slopes of two items, namely, the luminance value (Y) and the pixel value (R).

$GainR(G) = \Delta R(G)/\Delta Y(G)$ $GainG(G) = \Delta G(G)/\Delta Y(G)$ $GainB(G) = \Delta B(G)/\Delta Y(G)$ (Step S306)

The process in step S306 is a process executed by the luminance (Y) local slope calculation unit 204 of the signal correction unit 102 illustrated in FIG. 11.

The luminance (Y) local slope ($\Delta Y(L)$) calculation unit 204 executes the process described with reference to FIGS. 8 to 10.

That is, the following process is executed.

The pixel value change ratio (local slope) [$\Delta Y(L)$] of the luminance Y at the position of the correction target pixel (x, y) with respect to the adjacent pixel on the horizontal line is calculated.

Note that, in the present example, although the local slope [$\Delta Y(L)$] is described as a value difference between pixel values of two pixels, namely, the correction target pixel and its adjacent pixel, for example, a configuration using a pixel value difference for three pixels may be employed.

However, these pixels need to have a pixel region smaller than a pixel region for the global slope described above.

(Step S307)

In step S307, the signal correction unit 102 determines whether or not the pixel value change ratio (local slope) [$\Delta Y(L)$] of the luminance Y at the position of the correction target pixel (x, y) with respect to the adjacent pixel on the horizontal line calculated in step S306 is equal to or less than a defined threshold value (TH1). That is, $\Delta Y(L) \leq TH1$ it is determined whether or not the above determination formula is fulfilled.

In a case where the above determination formula is fulfilled, the process advances to step S308 to calculate the corrected pixel value of the correction target number sparsity (x, y).

On the other hand, in a case where the above determination formula is not fulfilled, the process advances to step S309 without executing the corrected pixel value calculation process in step S308.

This No determination process in step S307 represents the exception process described above with reference to FIG. 12.

(Step S308)

In a case where it is determined in step S307 that $\Delta Y(L) \leq TH1$ the above determination formula is fulfilled, the process advances to step S308 to calculate the corrected pixel value of the correction target pixel (x, y).

This process is a process executed by the corrected pixel value calculation unit 205 of the signal correction unit 102 illustrated in FIG. 11.

The corrected pixel value calculation unit 205 executes the processes described with reference to FIGS. 8 to 10.

That is, the following processes are executed.

The local slope [ΔY(L)] of the luminance Y is multiplied by the global gains of RGB [GainR(G), GainG(G), GainB (G)] and local application data of the global gains is calculated for the correction target pixel (x, y).

$$\Delta Y(L) \times \text{Gain}R(G)$$

$$\Delta Y(L) \times \text{Gain}G(G)$$

$$\Delta Y(L) \times \text{Gain}B(G)$$

Furthermore, the corrected pixel value RGBout (x, y) is calculated by adding the global gain local application data [ΔY(L)×GainR(G), ΔY(L)×GainG(G), ΔY(L)×BainR(G)] to the RGB pixel values [R(x−1, y), G(x−1, y), B(x−1, y)] of the adjacent pixel (x−1, y) of the correction target pixel (x, y).

$$R\text{out}(x,y) = R(x-1,y) + (\Delta Y(L) \times \text{Gain}R(G))$$

$$G\text{out}(x,y) = G(x-1,y) + (\Delta Y(L) \times \text{Gain}G(G))$$

$$B\text{out}(x,y) = B(x-1,y) + (\Delta Y(L) \times \text{Gain}B(G))$$

Through these processes, the signal correction unit 102 calculates the corrected RGB pixel values [Rout, Gout, Bout] of the correction target pixel (x, y).

(Step S309)

In step S309, the signal correction unit 102 determines whether or not the process for all the pixels of the image has completed.

Note that, in a case where the correction target pixels are limited in advance, it is determined whether or not the process for these correction target pixels has completed.

In a case where it is determined that the process has completed, the process advances to step S310.

In a case where unprocessed pixels are present, the process returns to step S303 and the processes in step S303 and the subsequent steps are executed for unprocessed pixels.

(Step S310)

In a case where it is determined in step S309 that the correction process has completed, the process advances to step S310.

The process in step S310 is a process executed by the output signal generation unit 103 illustrated in FIG. 4.

As illustrated in FIG. 4, the output signal generation unit 103 executes color space conversion that converts the RGB color space of the high-quality RGB image 13 generated by the signal correction unit 102, that is, the high-quality RGB image 13 with decreased banding, into the YCbCr color space and generates the high-quality YCbCr image 14.

As described above with reference to FIG. 13, this color space conversion process is executed, for example, by matrix conversion.

Specifically, a color space conversion process by an arithmetic process using the matrix illustrated in FIG. 13, that is, above-described (Formula 3), is executed.

As described above, the output signal generation unit 103 executes color space conversion that converts the RGB color space of the high-quality RGB image 13 generated by the signal correction unit 102 into the YCbCr color space and generates the high-quality YCbCr image 14 to output.

This high-quality YCbCr image 14 has color characteristics similar to color characteristics of the high-quality RGB image 13 generated by the signal correction unit 102 and is a high-quality image with decreased banding.

[4. About Hardware Configuration Example of Image Processing Apparatus]

Next, a hardware configuration example of the image processing apparatus of the present disclosure will be described with reference to FIG. 16.

The image processing apparatus according to the present disclosure is an image processing apparatus that accepts an input of an image and outputs an image and can be operated by being placed in hardware, or can be operated by software. FIG. 16 is a block diagram illustrating a configuration example of hardware of a computer as an image processing apparatus that implements the series of processes of the present disclosure as a software program and executes this program.

A central processing unit (CPU) 501 functions as a data processing unit that executes various processes in accordance with a program stored in a read only memory (ROM) 502 or a storage unit 508. For example, a process in accordance with the sequence described in the above embodiments is executed. A program, data, and the like executed by the CPU 501 are stored in a random access memory (RAM) 503. The CPU 501, the ROM 502, and the RAM 503 mentioned here are mutually connected by a bus 504.

The CPU 501 is connected to an input/output interface 505 via a bus 504, while an input unit 506 including various switches, a keyboard, a mouse, a microphone, and the like, and an output unit 507 including a display, a speaker, and the like are connected to the input/output interface 505. The CPU 501 executes various processes in response to an instruction input from the input unit 506 and outputs a processing result, for example, to the output unit 507.

The storage unit 508 connected to the input/output interface 505 includes, for example, a hard disk and the like and stores a program and various types of data executed by the CPU 501. A communication unit 509 functions as a transmission/reception unit for data communication via a network such as the Internet or a local area network and furthermore as a transmission/reception unit for a broadcast wave and communicates with an external apparatus.

A drive 510 connected to the input/output interface 505 drives a removable medium 511 such as a magnetic disk, an optical disc, or a magneto-optical disk, alternatively, a semiconductor memory such as a memory card and executes data recording or reading.

Note that the hardware configuration illustrated in FIG. 16 is an example and the processes of the present disclosure can be executed in a variety of devices provided with a memory in which a program recording the processing sequence in accordance with the above-described embodiments is saved and a data processing unit having a program execution function, such as a CPU; for example, a variety of devices include a personal computer (PC), a digital camera, and the like.

In addition, in the above-described embodiments, the description has been made on the processes for the YCbCr signals but, as explained earlier, the processes of the present application can also be applied to each of the YUV and YPbPr signals.

[5. Summary of Configuration of Present Disclosure]

The embodiments of the present disclosure have been minutely described thus far with reference to certain embodiments. However, it is self-evident that modification and substitution of the embodiments can be made by a person skilled in the art without departing from the spirit of the present disclosure. That is, the present invention has been disclosed in the form of exemplification and should not be interpreted restrictively. In order to judge the spirit of the present disclosure, the section of claims should be considered.

Note that the technology disclosed in the present description can be configured as follows.

(1) An image processing apparatus including a signal correction unit that:

accepts a subsampled image obtained by copying an adjacent pixel value to a pixel value thinning position, as an input image;

calculates a correction target signal global gain which is a ratio between a slope of a correction target signal and a slope of a luminance signal of a global region made up of a plurality of consecutive pixels including a pixel position of the correction target pixel of the input image;

calculates a luminance local slope which is a slope of the luminance signal of a local region smaller than the global region, the local region being a region within the global region, including the pixel position of the correction target pixel of the input image; and calculates a corrected pixel value of the correction target pixel by multiplying the luminance local slope by the correction target signal global gain and applying a multiplication result.

(2) The image processing apparatus according to (1), in which the signal correction unit calculates the corrected pixel value by adding a correction target signal pixel value at an end of the local region for which the luminance local slope has been calculated, to a multiplication value obtained by multiplying the luminance local slope by the correction target signal global gain.

(3) The image processing apparatus according to (1) or (2), in which the slope of a signal of the global region represents a pixel value difference between pixels at both ends of the global region, and the slope of a signal of the local region represents a pixel value difference between pixels at both ends of the local region.

(4) The image processing apparatus according to any one of (1) to (3), in which the global region is a region constituted by a plurality of adjacent pixels on a horizontal line including the correction target pixel.

(5) The image processing apparatus according to any one of (1) to (4), in which the input image is a YCbCr image signal obtained by thinning out chrominance signals Cb and Cr, the image processing apparatus further includes a color space conversion unit that converts the YCbCr image signal into an RGB image signal, and the signal correction unit assigns RGB pixel values of the RGB image signal generated by the color space conversion unit as a correction target signal and calculates corrected pixel values of the respective RGB pixel values using a luminance (Y) signal of the YCbCr image signal.

(6) The image processing apparatus according to (5), in which the color space conversion unit executes a color space conversion process by matrix conversion.

(7) The image processing apparatus according to (5) or (6), further including an output signal generation unit that executes a color space conversion process on a corrected RGB image signal generated by the signal correction unit to generate a corrected YCbCr signal.

(8) The image processing apparatus according to any one of (5) to (7), in which the signal correction unit:

assigns RGB pixel values of the RGB image signal generated by the color space conversion unit as a correction target signal;

calculates a global gain corresponding to each of RGB signals, which is a ratio between a slope of each of the RGB signals of the RGB image signal of the global region and a slope of the luminance (Y) signal of the YCbCr image signal; and calculates RGB pixel values after correction by multiplying the luminance local slope by each of the RGB signal global gains and applying a multiplication result.

(9) The image processing apparatus according to any one of (1) to (8), in which the local region is a region made up of two pixels, namely, a correction target pixel and an adjacent pixel of the correction target pixel.

(10) The image processing apparatus according to (9), in which the signal correction unit calculates the corrected pixel value by adding a pixel value of the adjacent pixel to a multiplication value obtained by multiplying the luminance local slope by the correction target signal global gain.

(11) The image processing apparatus according to any one of (1) to (10), in which the signal correction unit:

executes a corrected pixel value calculation process on a correction target pixel in a case where a difference between a pixel value of the correction target pixel and a pixel value of an adjacent pixel is equal to or less than a predetermined threshold value; and does not calculate a corrected pixel value of the correction target pixel in a case where the difference is larger than the predetermined threshold value.

(12) An image processing method executed in an image processing apparatus, the image processing method including:

accepting, by a signal processing unit, an input of a subsampled image obtained by copying an adjacent pixel value to a pixel value thinning position, as an input image;

calculating, by the signal processing unit, a correction target signal global gain which is a ratio between a slope of a correction target signal and a slope of a luminance signal of a global region made up of a plurality of consecutive pixels including a pixel position of a correction target pixel of the input image;

calculating, by the signal processing unit, a luminance local slope which is a slope of the luminance signal of a local region smaller than the global region, the local region being a region within the global region, including the pixel position of the correction target pixel of the input image; and calculating, by the signal processing unit, a corrected pixel value of the correction target pixel by multiplying the luminance local slope by the correction target signal global gain and applying a multiplication result.

(13) A program that executes an image process in an image processing apparatus, the program causing a signal processing unit to:

accept an input of a subsampled image obtained by copying an adjacent pixel value to a pixel value thinning position, as an input image;

execute a calculation process for a correction target signal global gain which is a ratio between a slope of a correction target signal and a slope of a luminance signal of a global region made up of a plurality of consecutive pixels including a pixel position of a correction target pixel of the input image;

execute a calculation process for a luminance local slope which is a slope of the luminance signal of a local region smaller than the global region, the local region being a region within the global region, including the pixel position of the correction target pixel of the input image; and execute a process of calculating a corrected pixel value of the correction target pixel by multiplying the luminance local slope by the correction target signal global gain and applying a multiplication result.

In addition, the series of processes described in the description can be executed by hardware, software, or a complex configuration of both. In the case of executing the processes by software, a program recording a processing sequence can be installed on a memory within a computer incorporated in dedicated hardware and executed or the program can be installed on a general-purpose computer capable of executing various processes and executed. For example, the program can be recorded in a recording medium in advance. In addition to installation from a recording medium to a computer, the program can be received via a network such as a local area network (LAN) or the Internet and installed on a recording medium such as a built-in hard disk.

Note that the various processes described in the description are not only executed in time series in accordance with the description but also may be executed in parallel or individually according to the processing capability of an apparatus that executes the processes or according to necessity. In addition, in the present description, the term "system" refers to a logical group configuration of a plurality of apparatuses and is not limited to a system in which apparatuses having respective configurations are accommodated in the same housing.

INDUSTRIAL APPLICABILITY

As described above, according to the configuration of an embodiment of the present disclosure, an apparatus and a method that decrease a banding phenomenon in a subsampled image and achieve high image quality are implemented.

Specifically, a subsampled image obtained by copying an adjacent pixel value to a pixel value thinning position is accepted as an input image; a correction target signal global gain is calculated as a ratio between a slope of a correction target signal and a slope of a luminance signal of a global region made up of a plurality of consecutive pixels including a pixel position of the correction target pixel of the input image; a luminance local slope is calculated as a slope of the luminance signal of a local region smaller than the global region, which is a region within the global region, including the pixel position of the correction target pixel of the input image; and a corrected pixel value of the correction target pixel is calculated by multiplying the luminance local slope by the correction target signal global gain and applying a multiplication result. For example, the corrected pixel value is calculated by adding a correction target signal pixel value at an end of the local region to a multiplication value.

Through these processes, an apparatus and a method that decrease a banding phenomenon in the subsampled image and achieve high image quality are implemented.

REFERENCE SIGNS LIST

101 Color space conversion unit
102 Signal correction unit
103 Output signal generation unit
201 Correction pixel selection unit
202 Luminance (Y) global slope (ΔY(G)) calculation unit
203 RGB global gain calculation unit
204 Luminance (Y) local slope (ΔY(L)) calculation unit
205 Corrected pixel value calculation unit
501 CPU
502 ROM
503 RAM
504 Bus
505 Input/output interface
506 Input unit
507 Output unit
508 Recording unit
509 Communication unit
510 Drive
511 Removable medium

The invention claimed is:

1. An image processing apparatus comprising a signal correction unit that:
   accepts a subsampled image obtained by copying an adjacent pixel value to a pixel value thinning position, as an input image;
   calculates a correction target signal global gain which is a ratio between a slope of a correction target signal and a slope of a luminance signal of a global region made up of a plurality of consecutive pixels including a pixel position of a correction target pixel of the input image;
   calculates a luminance local slope which is a slope of the luminance signal of a local region smaller than the global region, the local region being a region within the global region, including the pixel position of the correction target pixel of the input image; and
   calculates a corrected pixel value of the correction target pixel by multiplying the luminance local slope by the correction target signal global gain and applying a multiplication result.

2. The image processing apparatus according to claim 1, wherein
   the signal correction unit calculates the corrected pixel value by adding a correction target signal pixel value at an end of the local region for which the luminance local slope has been calculated, to a multiplication value obtained by multiplying the luminance local slope by the correction target signal global gain.

3. The image processing apparatus according to claim 1, wherein
   the slope of a signal of the global region represents a pixel value difference between pixels at both ends of the global region, and
   the slope of a signal of the local region represents a pixel value difference between pixels at both ends of the local region.

4. The image processing apparatus according to claim 1, wherein
   the global region is a region constituted by a plurality of adjacent pixels on a horizontal line including the correction target pixel.

5. The image processing apparatus according to claim 1, wherein
   the input image is a YCbCr image signal obtained by thinning out chrominance signals Cb and Cr,
   the image processing apparatus further includes a color space conversion unit that converts the YCbCr image signal into an RGB image signal, and
   the signal correction unit assigns RGB pixel values of the RGB image signal generated by the color space conversion unit as a correction target signal and calculates corrected pixel values of the respective RGB pixel values using a luminance (Y) signal of the YCbCr image signal.

6. The image processing apparatus according to claim 5, wherein
the color space conversion unit executes a color space conversion process by matrix conversion.

7. The image processing apparatus according to claim 5, further comprising an output signal generation unit that executes a color space conversion process on a corrected RGB image signal generated by the signal correction unit to generate a corrected YCbCr signal.

8. The image processing apparatus according to claim 5, wherein
the signal correction unit:
assigns the RGB pixel values of the RGB image signal generated by the color space conversion unit as a correction target signal;
calculates a global gain corresponding to each of RGB signals, which is a ratio between a slope of each of the RGB signals of the RGB image signal of the global region and a slope of the luminance (Y) signal of the YCbCr image signal; and
calculates RGB pixel values after correction by multiplying the luminance local slope by each of RGB signal global gains and applying a multiplication result.

9. The image processing apparatus according to claim 1, wherein the local region is a region made up of two pixels, namely, a correction target pixel and an adjacent pixel of the correction target pixel.

10. The image processing apparatus according to claim 9, wherein
the signal correction unit calculates the corrected pixel value by adding a pixel value of the adjacent pixel to a multiplication value obtained by multiplying the luminance local slope by the correction target signal global gain.

11. The image processing apparatus according to claim 1, wherein
the signal correction unit:
executes a corrected pixel value calculation process on a correction target pixel in a case where a difference between a pixel value of the correction target pixel and a pixel value of an adjacent pixel is equal to or less than a predetermined threshold value; and
does not calculate a corrected pixel value of the correction target pixel in a case where the difference is larger than the predetermined threshold value.

12. An image processing method executed in an image processing apparatus, the image processing method including:
accepting, by a signal processing unit, an input of a subsampled image obtained by copying an adjacent pixel value to a pixel value thinning position, as an input image;
calculating, by the signal processing unit, a correction target signal global gain which is a ratio between a slope of a correction target signal and a slope of a luminance signal of a global region made up of a plurality of consecutive pixels including a pixel position of a correction target pixel of the input image;
calculating, by the signal processing unit, a luminance local slope which is a slope of the luminance signal of a local region smaller than the global region, the local region being a region within the global region, including the pixel position of the correction target pixel of the input image; and
calculating, by the signal processing unit, a corrected pixel value of the correction target pixel by multiplying the luminance local slope by the correction target signal global gain and applying a multiplication result.

13. A program stored in a non-transitory computer readable medium that executes an image process in an image processing apparatus, the program causing a signal processing unit to:
accept an input of a subsampled image obtained by copying an adjacent pixel value to a pixel value thinning position, as an input image;
execute a calculation process for a correction target signal global gain which is a ratio between a slope of a correction target signal and a slope of a luminance signal of a global region made up of a plurality of consecutive pixels including a pixel position of a correction target pixel of the input image;
execute a calculation process for a luminance local slope which is a slope of the luminance signal of a local region smaller than the global region, the local region being a region within the global region, including the pixel position of the correction target pixel of the input image; and
execute a process of calculating a corrected pixel value of the correction target pixel by multiplying the luminance local slope by the correction target signal global gain and applying a multiplication result.

* * * * *